United States Patent
Francini et al.

(10) Patent No.: US 8,295,554 B2
(45) Date of Patent: Oct. 23, 2012

(54) METHOD OF DERIVING DIGITAL TERRAIN MODELS FROM DIGITAL SURFACE MODELS

(75) Inventors: Gianluca Francini, Turin (IT); Skjalg Lepsoy, Turin (IT)

(73) Assignee: Telecom Italia S.p.A., Milan (IT)

( * ) Notice: Subject to any disclaimer, the term of this patent is extended or adjusted under 35 U.S.C. 154(b) by 750 days.

(21) Appl. No.: 12/311,050

(22) PCT Filed: Sep. 19, 2006

(86) PCT No.: PCT/EP2006/066514
§ 371 (c)(1), (2), (4) Date: Aug. 4, 2009

(87) PCT Pub. No.: WO2008/034465
PCT Pub. Date: Mar. 27, 2008

(65) Prior Publication Data
US 2009/0304236 A1 Dec. 10, 2009

(51) Int. Cl.
*G06K 9/00* (2006.01)
(52) U.S. Cl. ........................................ 382/109
(58) Field of Classification Search .......... 382/109–113, 382/154–156, 190–193, 209–212; 703/2–6; 345/42–47, 440–444; 359/462–465
See application file for complete search history.

(56) References Cited

U.S. PATENT DOCUMENTS
2006/0013442 A1* 1/2006 McDowall et al. ............ 382/109
2006/0262117 A1* 11/2006 Chiba ............................ 345/440

OTHER PUBLICATIONS

Canu, et al., "Reconstruction of Buildings From Multiple High Resolution Images", Proceedings of the International Conference on Image Processing (ICIP), vol. 1, pp. 621-624, (Sep. 16, 1996).
Cord, et al., "Accurate Building Structure Recovery from High Resolution Aerial Imagery", Computer Vision and Image Understanding, Academic Press, vol. 82, No. 2, pp. 138-173, (2001).
Mayer, "Extraction of Tree Groups From High-Resolution Digital Surface Models", Image Processing, 2000. Proceedings. 2000 International Conference, vol. 2, pp. 712-715, (Sep. 10, 2000).

(Continued)

*Primary Examiner* — Atiba O Fitzpatrick
(74) *Attorney, Agent, or Firm* — Finnegan, Henderson, Farabow, Garrett & Dunner, L.L.P.

(57) ABSTRACT

A method of deriving a digital terrain model from a digital surface model of an area of interest includes: dividing the area of interest into a plurality of area portions or patches; calculating, from the digital surface model, a set of candidate surfaces adapted to represent a ground surface in each area portion; if such set includes at least two candidate surfaces, estimating a distance from the ground surface of each candidate surface by using a function of a set of geometrical features related to the considered candidate surface, such function being derived from a known relation between a digital surface model and the height of the ground surface in a reference area; selecting, as a representation of the ground surface in each area portion, the candidate surface having the smallest distance from the ground surface, so as to obtain local digital terrain models; and merging the different digital terrain models.

20 Claims, 18 Drawing Sheets

OTHER PUBLICATIONS

Gross, et al., "3-D Modeling of Urban Structures", CMRT05, IAPRS, vol. XXXVI, Part 3/W24, Vienna Austria, pp. 137-142, (Aug. 29-30, 2005).

Brenner, et al., "Fast Production of Virtual Reality City Models", Proc. ISPRS, Commission IV, Working Group IV/III.2, pp. 1-8, (1998).

Forlani, et al., "Building reconstruction and visualization from LIDAR data", The International Archives of the Photogrammetry, Remote Sensing and Spatial Information Sciences, vol. XXXIV, Part 5/W12, pp. 151-156, (2003).

Baillard, et al., "3-D Reconstruction of Urban Scenes from Aerial Stereo Imagery: A Focusing Strategy", Computer Vision and Image Understanding, vol. 76, No. 3, pp. 244-258, (Dec. 1999).

Fischler, et al., "Random Sample Consensus: A Paradigm for Model Fitting with Applications to Image Analysis and Automated Catography", Graphics and Image Processing, Communications of the ACM, vol. 24, No. 6, pp. 381-395, (Jun. 1981).

Hartley, et al., "Multiple View geometry in Computer Vision", Second Edition, Cambridge University Press, 4.7.1. RANSAC, pp. 117-119, (2003).

* cited by examiner

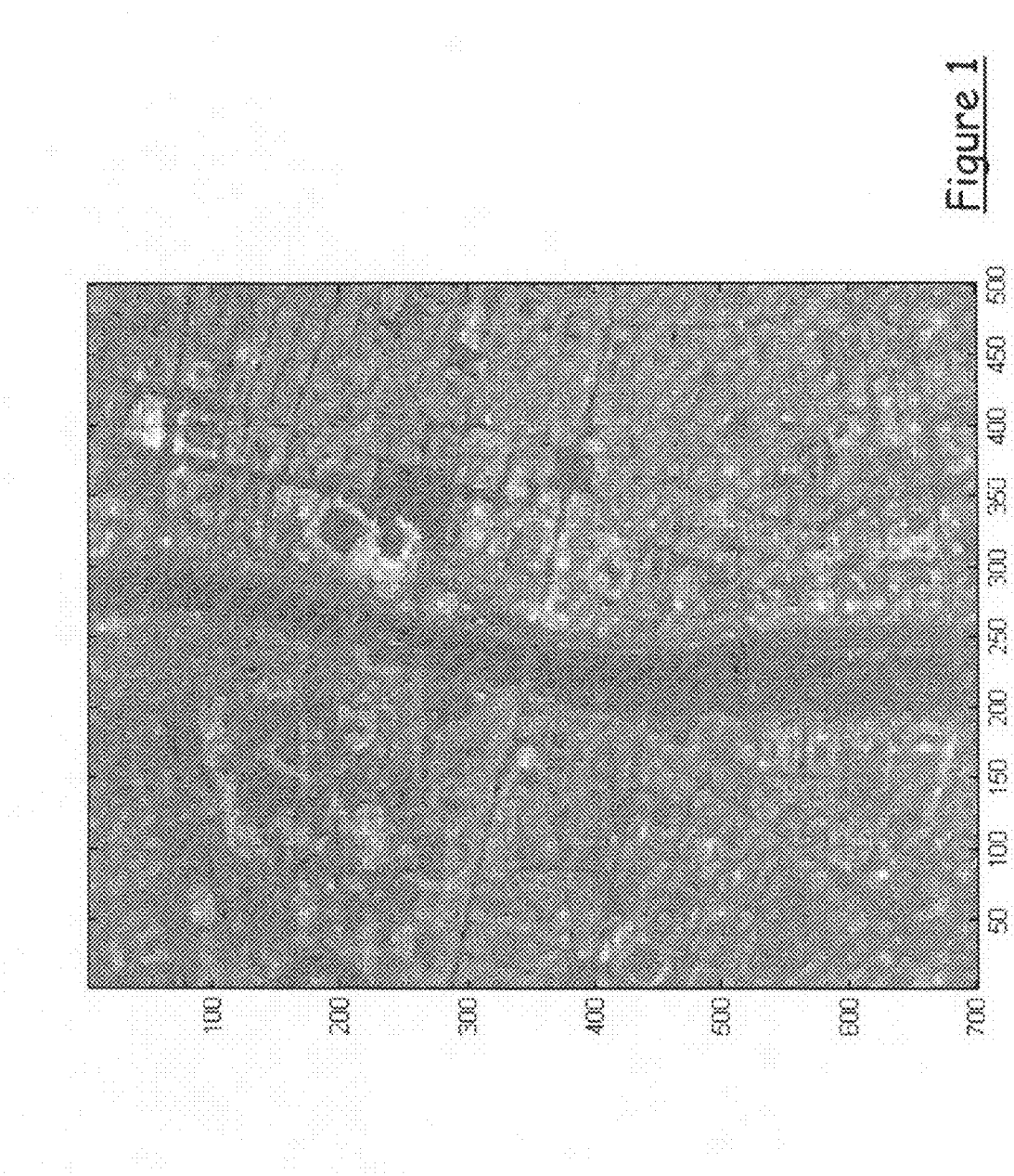

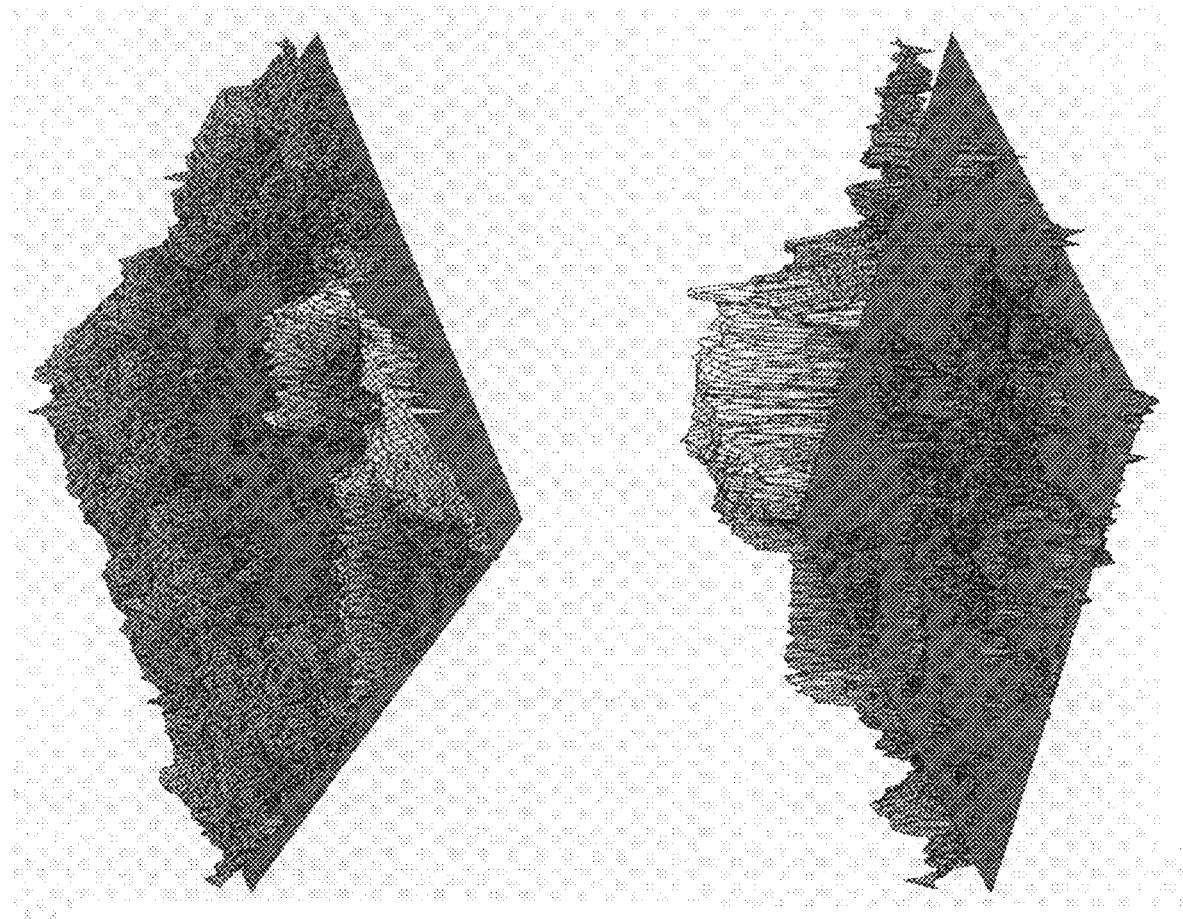

Figure 8

METHOD OF DERIVING DIGITAL TERRAIN MODELS FROM DIGITAL SURFACE MODELS

CROSS REFERENCE TO RELATED APPLICATION

This application is a national phase application based on PCT/EP2006/066514, filed Sep. 19, 2006, the content of which is incorporated herein by reference.

BACKGROUND OF THE INVENTION

1. Field of the Invention

The present invention generally relates to methods for obtaining geometrical models of the Earth surface, particularly, but not limitatively, for use in the planning of the coverage of radio communications network.

2. Description of the Related Art

Geometrical models of the Earth surface play an important role in fields like the radio communications network coverage planning, e.g. in mobile telecommunications systems like the UMTS (Universal Mobile Telecommunications System), or in broadcasting systems like the DVB-T (Digital Video Broadcasting-Terrestrial) and the DVB-H (Digital Video Broadcasting-Handheld), the latter being a digital video broadcasting over a mobile telecommunications network, the WiMAX.

Mainly, two classes of geometrical models of the Earth surface are known: the class of Digital Surface Models (DSMs), and that of Digital Terrain Models (DTMs).

A DSM provides a representation of the Earth's surface as it can be observed from above, typically from an airplane or a satellite, and contains indications of height, typically obtained by a telemetering system, related to the top of buildings and/or trees wherever the ground surface is not visible.

A DTM provides on the contrary indications about the elevation of the ground surface, also in areas where it is covered by buildings or trees.

In other words, both the DSM and the DTM are numeric representations of the height, but the DSM contains data related to the highest detected points of the metered objects, such as the top of trees, buildings and other man-made artifacts, and indicates the height of the ground surface only where it is not covered by objects; the DTM represents instead, in every point of the considered area, the height of the ground surface.

The DTMs can be derived from an analysis of the DSMs, by detecting objects located on the ground surface and, in that points, replacing the measured height with a derived height of the ground surface, as well as correcting errors (referred to as noise) in the DSMs caused by the data acquisition system.

Known methods for automatically converting DSMs into DTMs exploit additional information sources, like cadastral maps, which allow identifying areas covered by buildings and other man-made artifacts, or multi-spectra photography, which facilitates distinguishing among vegetation, roofs of buildings and other types of objects. For example, the article of C. Brenner et a/, "Fast production of virtual reality city models", Proc. ISPRS, 1998, describes an approach that uses 2D ground plans and a laser DSM to derive 3D building geometry automatically, whereas texture is taken from terrestrial photographs; the main operations are: (a) the subdivision of the buildings' contours as they appear in the cadastral map into rectangles, (b) the association of each rectangle to a three-dimensional primitive, based on the analysis of the DSM, (c) the estimation of the parameters for each three-dimensional primitive, and (d) the union of the three-dimensional primitives for creating a model of the buildings.

Other methods known in the art for automatically converting DSMs into DTMs do not exploit additional information sources, but are based on the assumption that the noise in the DSM is very low; this assumption is reasonably close to the truth in DSMs obtained using the LIDAR (Light Detection And Ranging) technique. An example of this class of methods is provided by H. Gross et al, "3D-modeling of urban structures", in Stilla U, Rottensteiner F, Hinz S (Eds) CMRT05, IAPRS, Vol. XXXVI, Part 3/W24, Vienna, Austria, Aug. 29-30, 2005; in that paper an automatic method is proposed for the generation of DTMs from high-quality DSMs obtained using LIDAR detection. Firstly, a gradient for the whole model is calculated; the points where the norm of the gradient exceeds a predetermined threshold are identified as "essential" points. The height is then interpolated linearly between the essential points, separately for the rows and the columns in the support of the model. The average of the two models, obtained by means of operations along the rows and the columns, is then filtered to obtain the DTM. Another example of this class of methods is provided in G. Forlani et a/, "Building reconstruction and visualization from LIDAR data", The International Archives of the Photogrammetry, Remote Sensing and Spatial Information Sciences, Vol. XXXIV, Part 5/W12, 2003; in this case, LIDAR-acquired maps of limited width (800 m) are used; exploiting the high quality of the data, the buildings are identified thanks to the abrupt transition among the ground surface and the objects on it; a building is regarded as a volume enclosed between planes.

In case of DSMs characterized by high noise, and In absence of additional information sources like cadastral maps, the conversion of the DSM into the DTM is typically made manually or at most semi-automatically; in particular, a manual intervention is needed to identify points that can be designated as belonging to the ground surface. An example of this class of methods is provided in C. Baillard et a/, "3-D Reconstruction of Urban Scenes from Aerial Stereo Imagery: A Focusing Strategy", Computer Vision and Image Understanding Vol. 76, No. 3, December, pp. 244-258, 1999: an iterative semi-automatic method is presented to produce DTMs starting from DSMs, with a manual initialization. The DSM is subdivided into disjoint patches, and the operator selects a point belonging to the ground surface for each patch. Then, the selected points are used as nodes or vertexes of a triangulation. The heights are then interpolated, obtaining a planar surface for each triangle. The DTM is then improved in an automatic way, searching the minimum of an energy function; during the execution, the nodes are classified as either "ground" or "not ground".

SUMMARY OF THE INVENTION

The Applicant has tackled the problem of providing a method for deriving DTMs from DSMs automatically, without the use of additional information sources and even in presence of DSMs that are affected by significant noise, i.e. DSMs possibly acquired using relatively simple and inexpensive techniques like the photogrammetry, and not necessitating sophisticated acquisition techniques like the LIDAR. In fact, compared to acquisition techniques like the conventional photogrammetry, the acquisition of high-quality DSMs exploiting LIDAR techniques such as the known ALS (Airborne Laser Scanning) are very expensive, because the acquisition requires flights at a lower height over the ground surface and at a lower speed; moreover, the field of sight of the LIDAR sensors is typically lower (20° to 40°) compared to that of cameras used in photogrammetry (75°): many more flights are thus necessary to cover a certain area. Furthermore, due to the low height of flight, it is often difficult to plan the flights in difficult areas like mountain regions.

The Applicant has found that an efficient way to convert a DSM into a DTM comprises computing a set of candidate surfaces suitable to represent the ground surface and using an ad-hoc function to estimate the distance from the ground surface of each candidate surface, so as to be able to select the best one. The computation of the candidate surfaces and the selection of the best one is preferably carried out in sub-areas of the area of interest, and the selected candidate surfaces are then merged to form a single surface. The above ad-hoc function can be derived from a previously-determined relation between the DSM and the DTM in a reference area. The candidate surface can be computed by applying a random sample consensus method.

Therefore, according to an aspect of the present invention, a method of deriving a digital terrain model from a digital surface model of an area of interest is provided, comprising the following steps:
 a) calculating, from the digital surface model, a set of candidate surfaces adapted to represent a ground surface in the area of interest and, if said set includes at least two candidate surfaces:
 b) estimating a distance from the ground surface of each of the candidate surfaces by using a function of a set of geometrical features related to the considered candidate surface, said function being derived from a known relation between a digital surface model and the height of the ground surface in a reference area; and
 c) selecting, as representative of the ground surface in the area of interest, the surface among the candidate surfaces having the smallest estimated distance from the ground surface.

Preferably, the method further comprises the following steps:
 d) dividing the area of interest into a plurality of area portions;
 e) deriving, for each of the area portions, a local digital terrain model from a local digital surface model, wherein deriving the local digital terrain model includes performing steps from a) to c) starting from the local digital surface model; and
 f) merging the local digital terrain models to obtain the digital terrain model of the area of interest.

The area portions of said plurality are preferably such that each area portion intersects with at least another area portion of said plurality.

The method preferably comprises selecting, for each point of the area of interest belonging to at least two area portions, the minimum height among the heights of the local digital terrain models derived for the area portions at that point of the area of interest.

The step a) may include applying a random sample consensus method.

In particular, the step a) may include:
 a1) selecting three sample points on the digital surface model;
 a2) calculating a plane passing through the three selected points;
 a3) determining, in the area of interest, a sub-set of points in the digital surface model whose distance from the plane is within a predetermined range;
 a4) determining the cardinality of the sub-set of points; and
 a5) if the cardinality exceeds a predetermined threshold, re-calculating the plane by minimizing the distance for all the points of the sub-set;
 a6) otherwise, if the cardinality is lower than the predetermined threshold, iterating the steps from a1) to a4).

The method preferably includes performing the steps from a1) to a6) for each of said area portions.

Moreover, the method preferably comprises iterating the steps from a1) to a6) a predetermined number of times.

The method may also comprise storing said sub-set of points at each iteration of steps from a1) to a6).

Moreover, the method may comprise selecting, among the stored sub-set of points, the sub-set of points having the greatest cardinality, wherein the plane associated with the selected sub-set of points defines one of the candidate surfaces.

The method preferably comprises repeating the steps from a1) to a6) omitting said selected sub-set of points so as to find at least another one of the candidate surfaces.

The steps of storing said sub-set of points, selecting the sub-set of points having the greatest cardinality and repeating the steps from a1) to a6) omitting said selected sub-set of points are preferably performed in each of the area portions.

Said set of geometrical features related to the considered candidate surface may comprise one or more among:
 a relative cardinality between a set of points that belong to at least a portion of the area of interest and whose distance from the considered candidate surface is within a predetermined range and the set of all the points within said portion of the area of interest;
 a resistance to a median filtering of said set of points that belong to at least a portion of the area of interest and whose distance from the considered candidate surface is within a predetermined range;
 a height of the candidate surface.

The above function may be of the following type:

$$F(f(\mu_m, w), \theta) = [f_1(\mu_m, w) \ \ldots \ f_L(\mu_m, w) \ 1] \begin{bmatrix} \theta_1 \\ \vdots \\ \theta_{L+1} \end{bmatrix}$$

wherein $\mu_m$ denotes the generic candidate surface, w denotes a height derived from the digital surface model, $f_1, \ldots, f_L$ are said geometrical features, and $\theta_1, \ldots, \theta_{L+1}$ are parameters.

In particular, the above function may be of the type:

$$F(f, \theta) = \left(\sum_{r=1}^{3} f_r \theta_r\right) + \theta_4$$

wherein $f_1$, $f_2$ and $f_3$ represent the relative cardinality, the resistance to the median filtering, and the height of the candidate surface.

The above-mentioned known relation may be:

$$g(\mu_m | z) = (z - \mu_m)^T \Sigma^{-1} (z - \mu_m),$$

wherein $\mu_m$ denotes a generic m-th candidate surface and z denotes a generic local digital terrain model.

The above cited parameters may be derivable from the equation:

$$\hat{\theta} = \arg\min_{\theta} \sum_{n=1}^{N} \sum_{m=1}^{M_n} (g(\mu_m^n \mid z_n) - F(f(\mu_m^n, w_n), \theta))^2$$

wherein N denotes the number of said area portions, $M_n$ denotes the number of said candidate surfaces for the n-th area portion, $\mu_m^n$ denotes the m-th candidate surface for the n-th area portion, $z_n$ denotes the local digital terrain model for the n-th area portion, and $w_n$ denotes the local digital surface model for the n-th area portion.

The step of merging preferably comprises combining the local digital terrain models by means of a convex combination.

The method may further comprise the step of removing discontinuities in the digital surface model obtained by combining the local digital terrain models.

The method may also comprise repeating the steps from d) to f) for at least two subdivisions of said area of interest into area portions, wherein the area portions in the two subdivisions are different in size.

The present invention also relates to a system for deriving a digital terrain model from a digital surface model of an area of interest, comprising:
  a calculator module configured to calculate, from the digital surface model, a set of candidate surfaces adapted to represent a ground surface in said area of interest and, if said set includes at least two candidate surfaces:
  a selector module configured to estimate a distance from the ground surface of each of said candidate surfaces by using a function of a set of geometrical features related to the considered candidate surface, said function being derived from a known relation between a digital surface model and the height of the ground surface in a reference area, and to select, as representative of the ground surface in said area of interest, the surface among said candidate surfaces having the smallest estimated distance from said ground surface.

The present invention also relates to a computer program directly loadable into a working memory of a data processing system and adapted to implement, when executed, the method previously described, and to a computer program product comprising a computer readable media having stored therein this computer program.

BRIEF DESCRIPTION OF THE DRAWINGS

The features and advantages of the present invention will be made clear by the following detailed description of an embodiment thereof, provided merely by way of non-limitative example; in the following description, reference will be made to the annexed drawings, wherein:

FIG. 1 is a picture of an exemplary DSM, captured by an airborn stereo camera sensor on an area of interest;

FIGS. 4A and 4B show, respectively from above and from below, a first hypothetic plane extracted by a patch of a support of the DSM of FIG. 1;

FIG. 8 shows a median filtering mask used for calculating a feature of the hypothetic surfaces;

DETAILED DESCRIPTION OF THE PREFERRED EMBODIMENT(S) OF THE INVENTION

A DSM and a DTM are digital models of the Earth's surface that contain data describing the heights in terms of a function h on a set G of coordinates of a coordinate system in a two-dimensional space. These models are mathematically expressed as:

$$H = \{h(x,y) \in R : (x,y) \in G \subset R^2\} \quad (1)$$

where (x,y) are the two coordinates of the coordinate system, representing for example the latitude and the longitude, R is the field of real numbers, and h denotes the height of the generic point of coordinates (x,y); the height h may be referred to a surface passing for the average level of the sea (this corresponds to considering the Earth as a geoid); the set G of coordinate values is called "the support" of the digital Earth's surface model.

According to an embodiment of the present invention, the two coordinates (x,y) can take discrete values, i.e. the coordinate system consists of a discrete grid. The support G may coincide with the discrete grid, or, in case of Earth's surface models defined on a continuous support G, the discrete grid represents a sub-set of the continuous support G, obtained by a sampling process.

Let it be assumed that a DSM defined on a support G is available, like the DSM depicted in FIG. 1, and that it is desired to derive a corresponding DTM. The image is captured by an airborn stereo camera sensor on an area of interest. The x and y scales are in arbitrary units, were a unit is 2.5 m.

Figure 2:
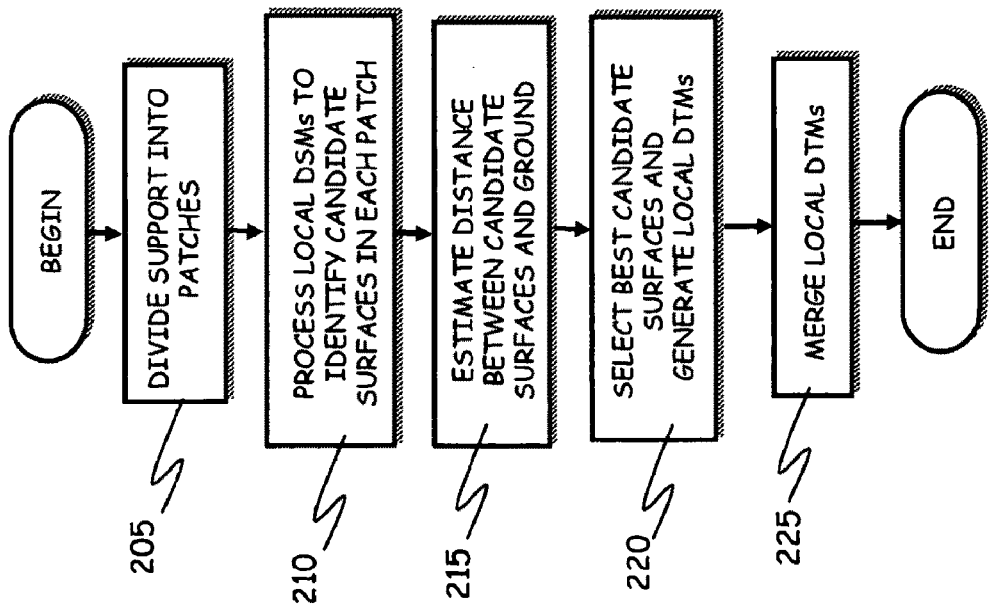
FIG. 2 shows, in terms of a schematic flowchart, the essential steps of a method for deriving a DTM from a DSM, according to an embodiment of the present invention.

In FIG. 2 the main steps of a procedure to derive a DTM from a DSM according to an embodiment of the present invention are schematically depicted, in the form of a flowchart.

In a first step (block 205), the support G of the area of interest is subdivided into a plurality of M sub-sets (or area portions), referred to as "patches" $G_m$:

$$G_m: m=1, \ldots, M, \text{or } \{G_m\}_{m=1}^M.$$

Preferably, the patches are such that each patch $G_i$ intersects with at least another patch $G_j$ of said plurality in order to better detect variations in the ground height:

$$|G_i \cap G_j| \geq 0$$

and the union of all the patches forms the entire support G:

$$G = \bigcup_{m=1}^M G_m.$$

The patches may for example be rectangular in shape, and arranged on a regular grid.

Considering the generic patch $G_m$, the Earth surface model (DSM or DTM) on that patch is the set:

$$H(G_m) = \{h(x,y)(R:(x,y) \in G_m \subset R^2\},$$

which is a sub-set of the set H of (1) defined over the entire support G. The sub-set $H(G_m)$ is referred to as the "local model" ("local DSM" or "local DTM").

For each patch $G_m$, the local DSM is processed in such a way as to identify a set of surfaces (hereinafter referred to as "hypothetic surfaces") each constituting a ground surface height hypothesis, i.e. a candidate surface for representing the ground surface (block 210). The local DSM of each patch $G_m$ is processed independently from the local DSMs of the other patches.

In certain cases it may happen that only one candidate surface is identified, in which cases that candidate surface is considered as a local DTM.

If the set of surfaces includes at least two candidate surfaces, the method includes generating for each patch a local DTM by analysing a relationship between the local DSM and the corresponding set of hypothetic surfaces.

In particular, the method includes estimating a distance from the ground surface of each candidate surface by using a function of a set of geometrical features related to the considered candidate surface, such function being derived from a known relation between the DSM and the height of the ground surface in a reference area (block 215), which area could be different from the area of interest.

Then, the method includes making a choice among the set of hypothetic surfaces to select the candidate surface that best represents the ground surface; this is done by selecting, as a representation of the ground surface in each patch, the candidate surface having the smallest distance from the ground surface, so as to obtain the local DTM (block 220).

Once the local DTMs have been determined, i.e. the best candidate surface has been identified for each patch, the local DTMs are merged to obtain the complete DTM (block 225).

The phases of the method are described in greater detail in the following.

As mentioned in the foregoing, a DSM provides an indication of the highest detected surface, which is formed of natural elements, like the ground, the surface of lakes, rivers, the top of the trees, and of man-made artefacts, like the roof of buildings, the surface of roads, bridges etc. Most of these elements have exposed surfaces of non-negligible extension, typically planar or of low curvature. To the extent that the DSM is composed of such surfaces, the DSM can be approximated using a set of planar surfaces, often with irregular contours. These surfaces, extended to cover the whole patch, are used as the hypothetic surfaces, i.e. as the candidate surfaces for representing the ground surface. The choice of planar surfaces, or surfaces of low curvature, as candidate surfaces rests on the assumption that the ground over a sufficiently small area may be well approximated by a planar (or low-curvature) surface.

In an embodiment of the present invention, in order to build an approximation of the DSM in terms of essentially planar surfaces a known method called "RANSAC" (acronym for RANdom SAmple Consensus") is used. The RANSAC method (described for example in M. A. Fischler and R. C. Bolles, "Random sample consensus: a paradigm for model fitting with applications to image analysis and automated cartography", Communications of the ACM, Vol. 24, Issue 6, June 1981, pp. 381-395) is known to be well suited to identify sub-sets on which a function of two variables, like the DSM, can be approximated by a plane or, more generally, by a linear combination of few basic functions.

As defined in Wikipedia, the Internet free encyclopedia, RANSAC is an algorithm to estimate parameters of a mathematical model from a set of observed data. A basic assumption is that the data consists of "inliers", i.e., data points which can be explained by some set of model parameters, and "outliers" which are data points that do not fit the model. In addition to this, the data points can be subject to noise. The outliers can come, e.g., from extreme values of the noise or from erroneous measurements or incorrect hypotheses about the interpretation of data. RANSAC also assumes that, given a (usually small) set of inliers, there exists a procedure which can estimate the parameters of a model that optimally explains or fits this data. The algorithm was first published in the above article of Fischler and Bolles.

A simple example is fitting of a 2D line to set of observations. Assuming that this set contains both inliers, i.e., points which approximately can be fitted to a line, and outliers, points which cannot be fitted to this line, a simple least squares method for line fitting will in general produce a line with a bad fit to the inliers. The reason is that it is optimally fitted to all points, including the outliers. RANSAC, on the other hand, can produce a model which is only computed from the inliers, provided that the probability of choosing only inliers in the selection of data points is sufficiently high. There is no guarantee for this situation, however, and there are a number of algorithm parameters which must be carefully chosen to keep the level of probability reasonably high.

An advantage of RANSAC is its ability to do robust estimation of the model parameters, i.e., it can estimate the parameters with a high degree of accuracy even when outliers are present in the data set. As described in R. Hartley and A. Zissermann, "Multiple View geometry in Computer Vision", Second Edition, Cambridge University Press, 2003, pages 118-119, the objective of the RANSAC algorithm is robust fit of a model to a data set S which contains outliers, and the algorithm comprises the following steps:

i) Randomly select a sample of s data points from S and instantiate the model from this subset.

ii) Determine the set of sata points $S_i$ which are within a distance threshold t of the model. The set $S_i$ is the consensus set of the sample and defines the inliers of S.

iii) If the size of $S_i$ (the number of inliers) is greater than some threshold T, re-estimate the model using all the points in $S_i$ and terminate.

iv) If the size of $S_i$ is less than T, select a new subset and repeat the above.

v) After N trials the largest consensus set $S_i$ is selected, and the model is re-estimated using all the points in the subset $S_i$.

Figure 3:
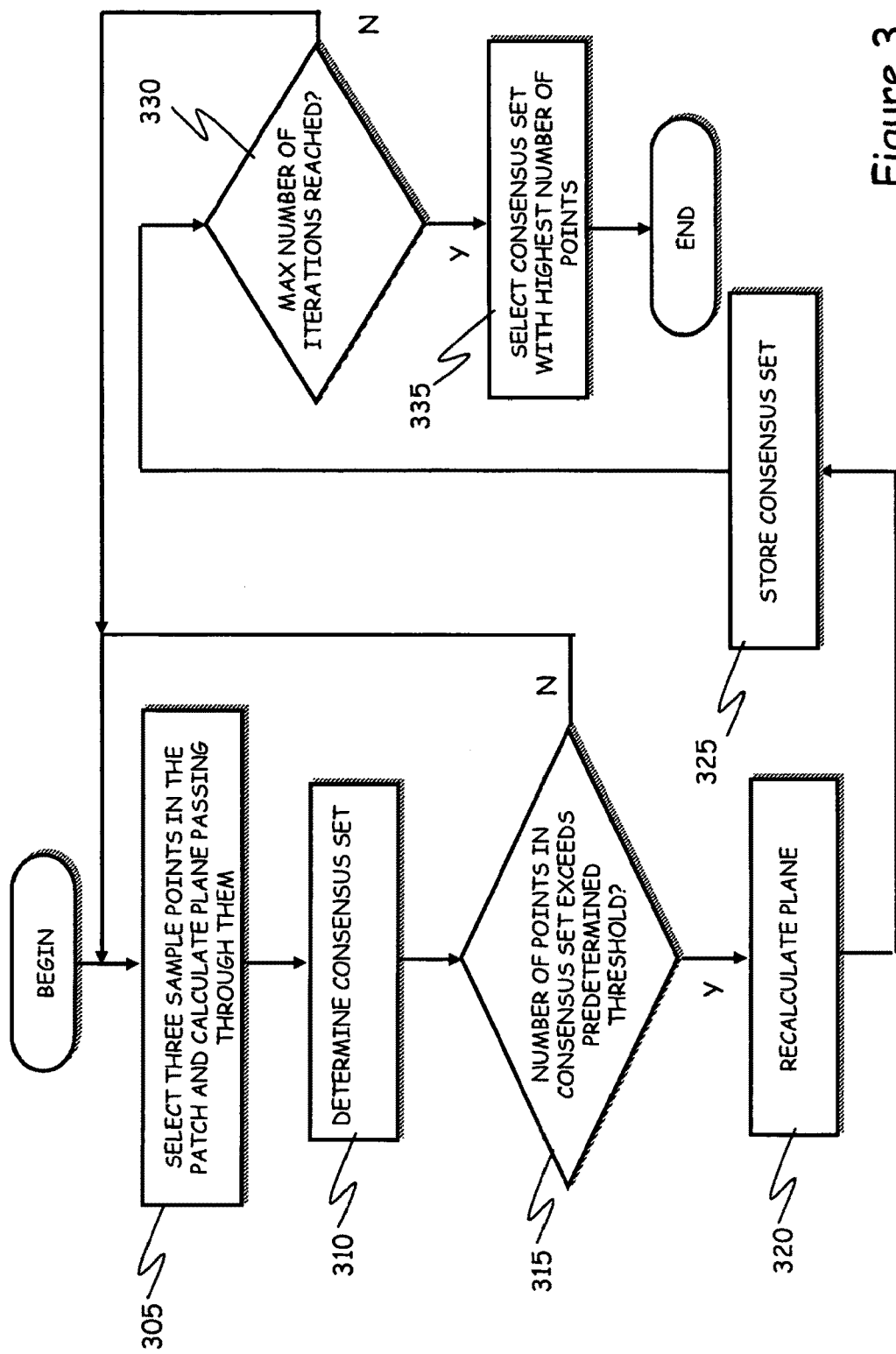
FIG. 3 shows, in terms of a schematic flowchart, the main steps of a method for calculating hypothetic surfaces candidate for representing the ground surface.
Figure 5A:
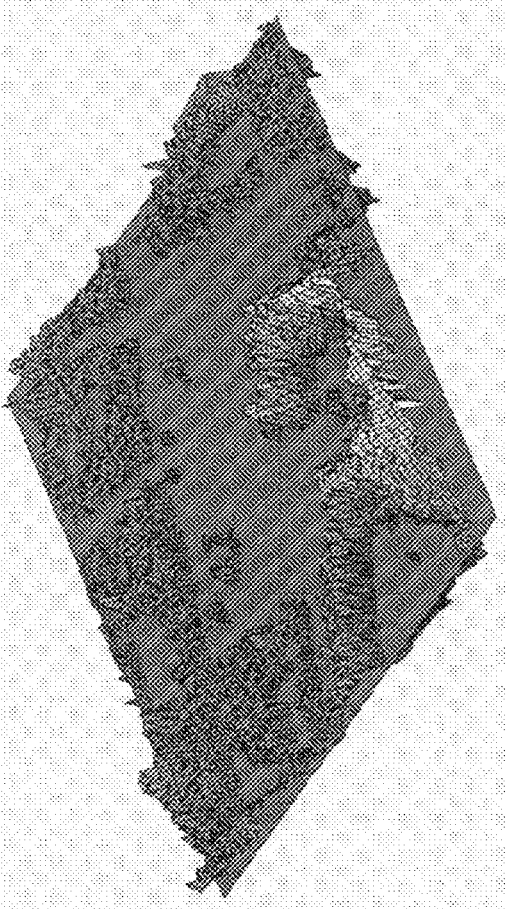
FIGS. 5A and 5B show, respectively from above and from below, a second hypothetic plane extracted by a patch of a support of the DSM of FIG. 1.
Figure 5B:
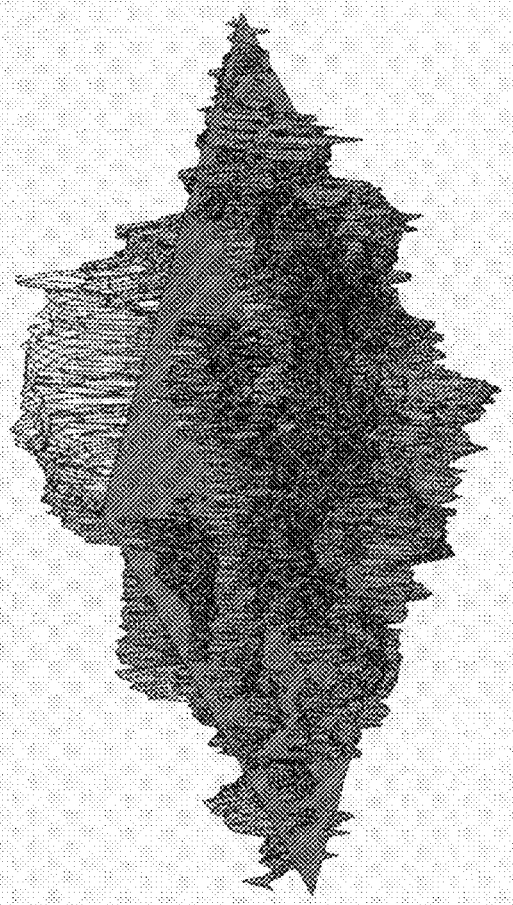
Figure 6A:
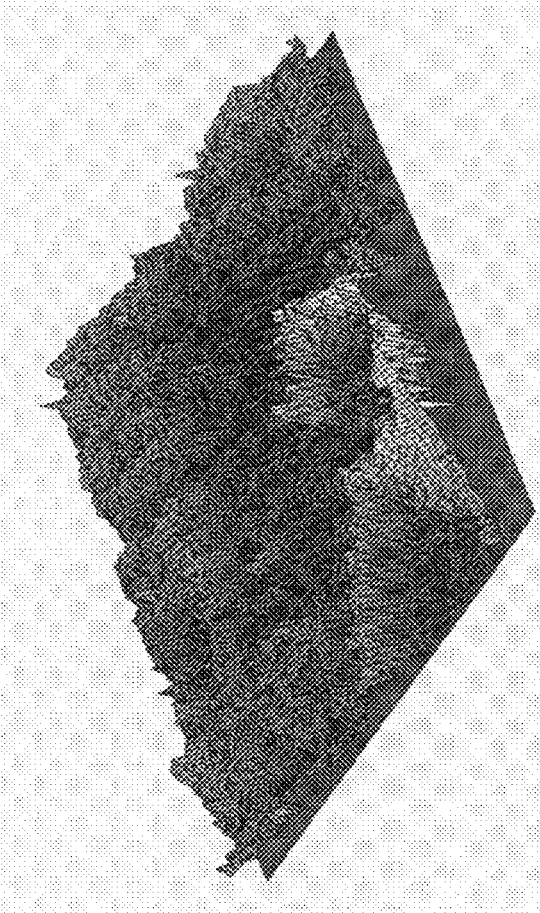
FIGS. 6A and 6B show, respectively from above and from below, a third hypothetic plane extracted by a patch of a support of the DSM of FIG. 1.
Figure 6B:
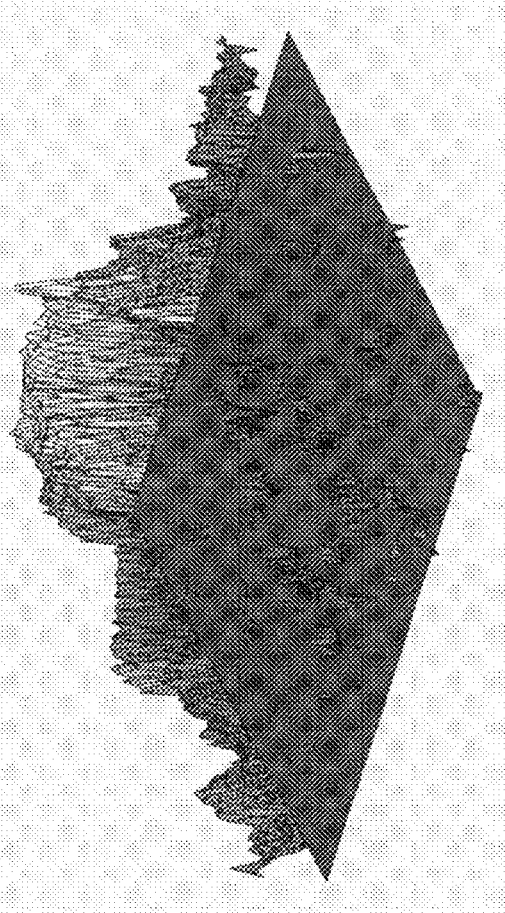
Figure 7A:
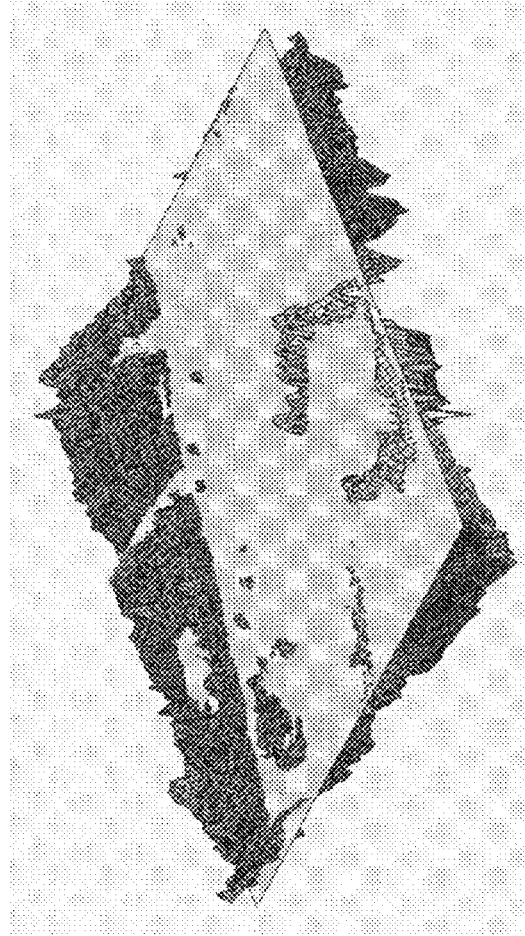
FIGS. 7A and 7B show, respectively from above and from below, a fourth hypothetic plane extracted by a patch of a support of the DSM of FIG. 1.
Figure 7B:
Figure 9B:
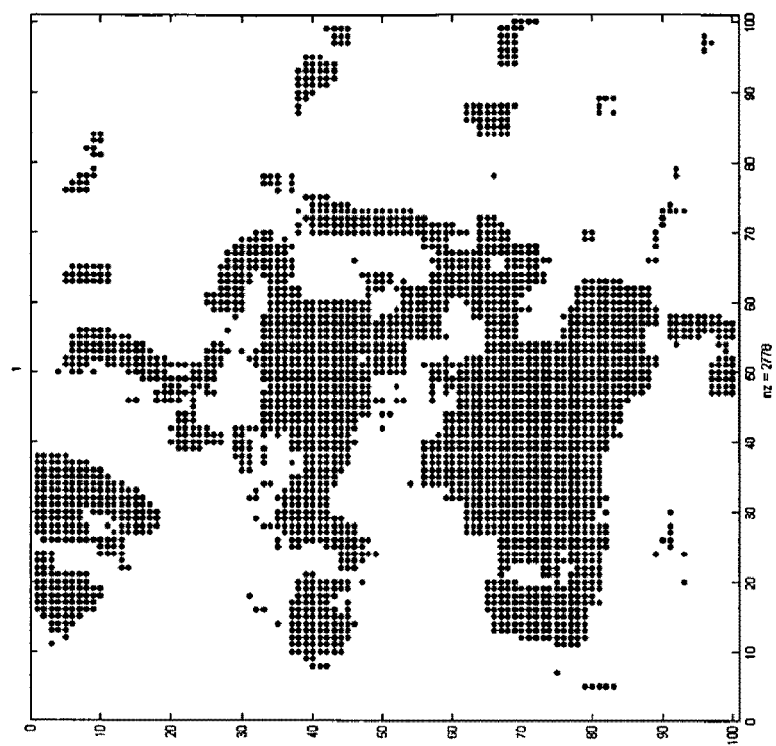
FIGS. 9A and 9B show points of a consensus set associated with the hypothetic plane of FIGS. 4A and 4B, before and after a median filtering with the mask of FIG. 8.
Figure 9A:
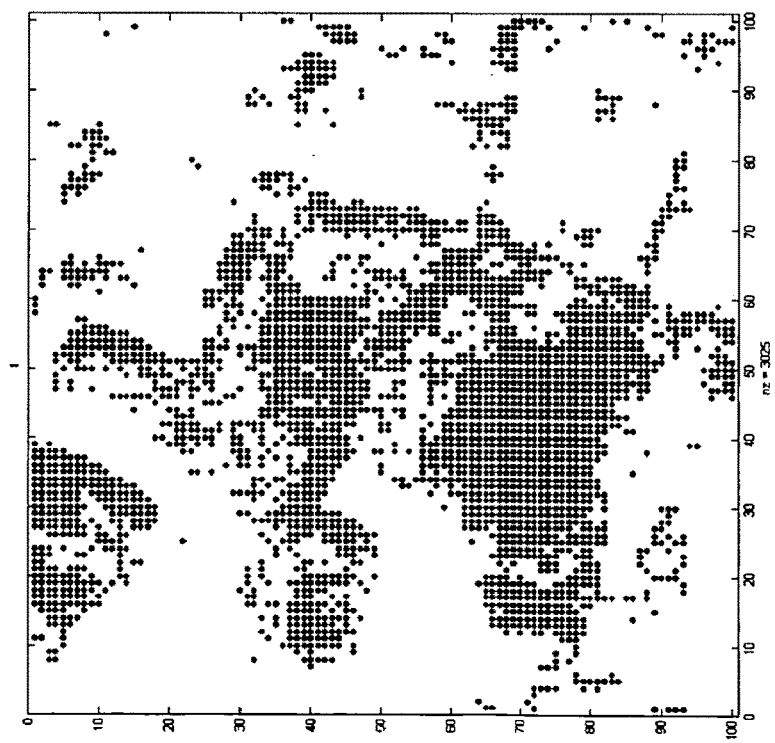
Figure 10B:
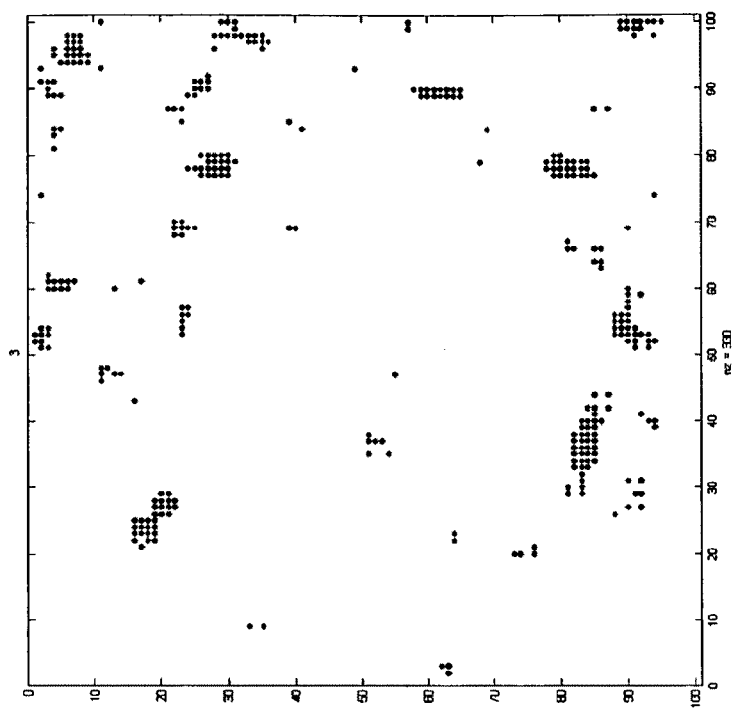
FIGS. 10A and 10B show points of a consensus set associated with the hypothetic plane of FIGS. 5A and 5B, before and after a median filtering with the mask of FIG. 8.
Figure 10A:
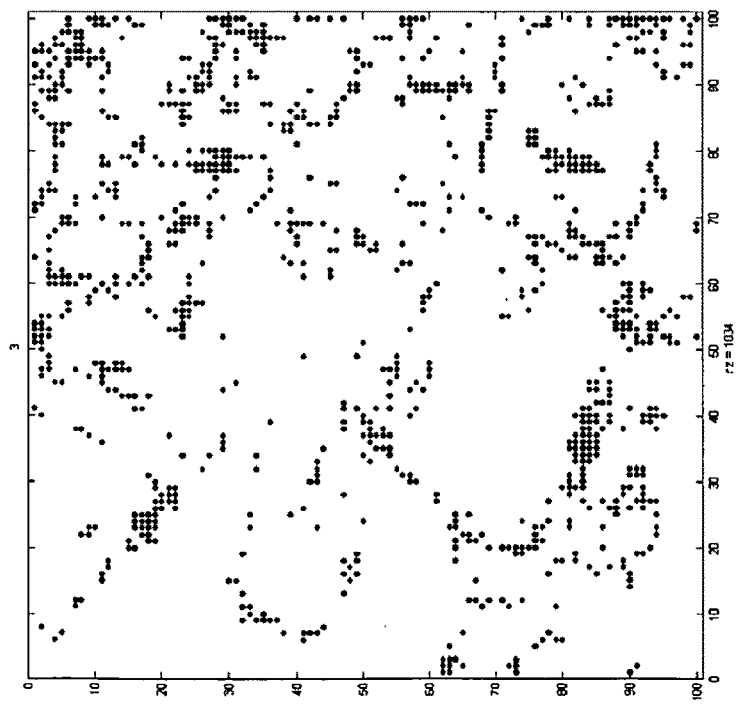
Figure 11B:
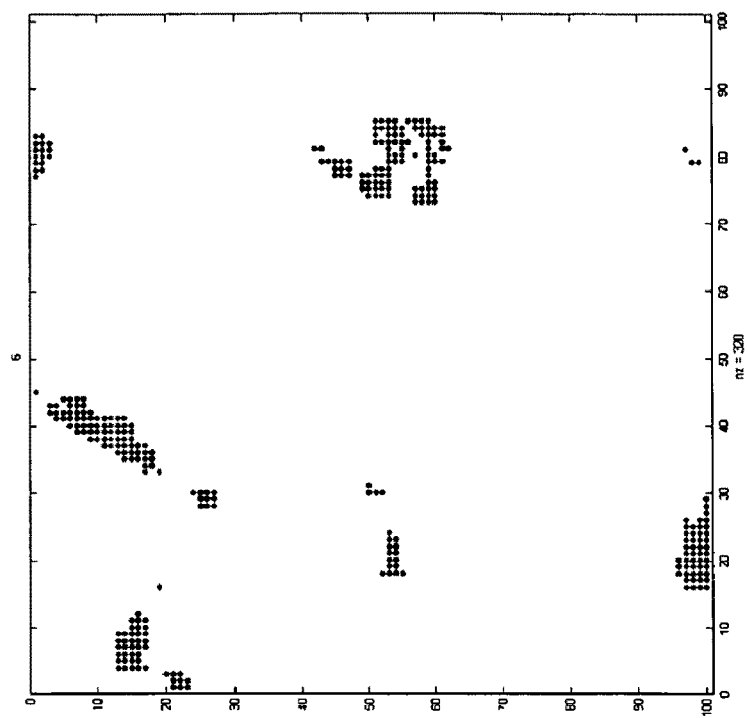
FIGS. 11A and 11B show points of a consensus set associated with the hypothetic plane of FIGS. 6A and 6B, before and after a median filtering with the mask of FIG. 8.
Figure 11A:
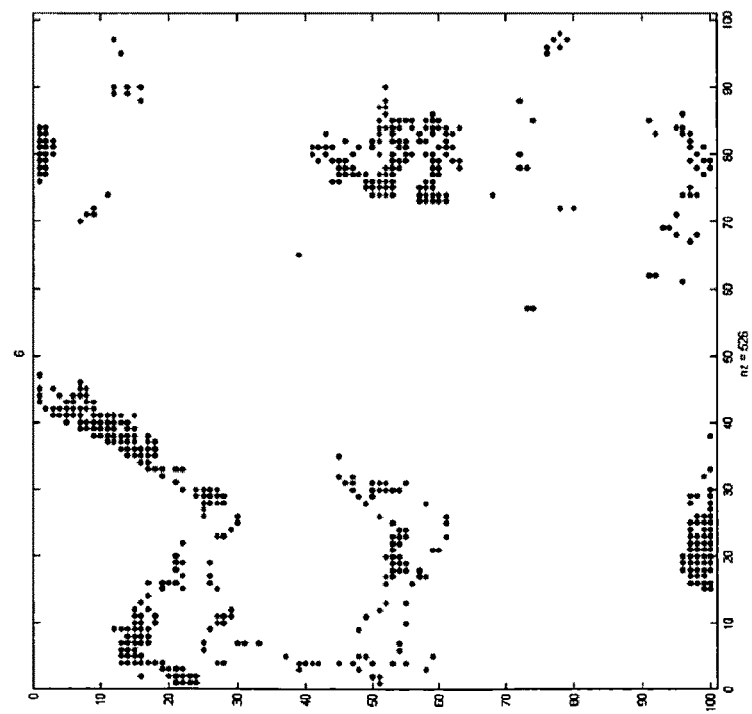
Figure 12B:
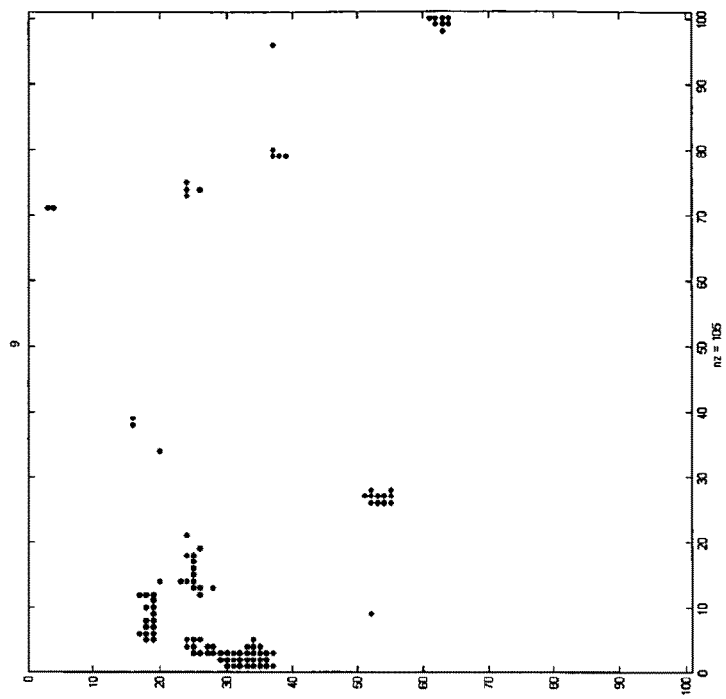
FIGS. 12A and 12B show points of a consensus set associated with the hypothetic plane of FIGS. 7A and 7B, before and after a median filtering with the mask of FIG. 8.
Figure 12A:
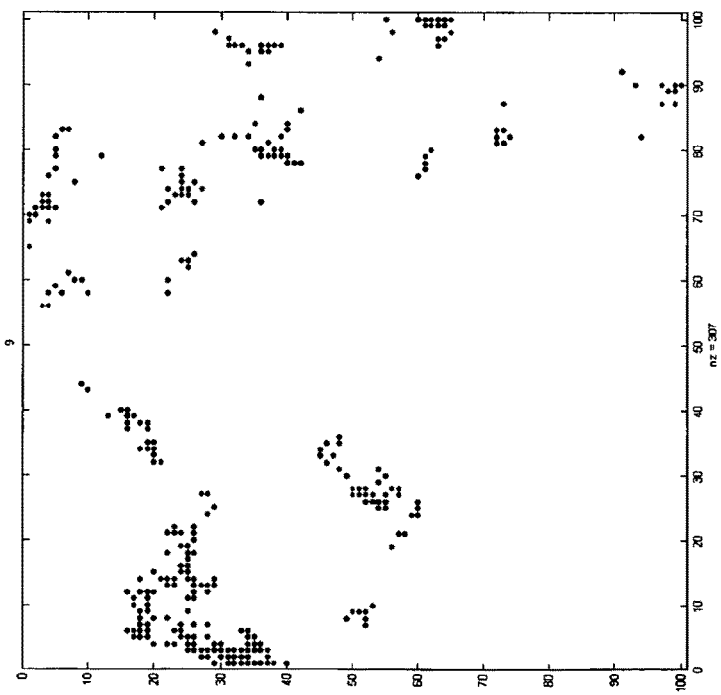

A schematic, simplified flowchart of the RANSAC method applied to DSMs is depicted in FIG. 3; essentially, given a DSM on a support G, and a patch $G_m \subset G$, the RANSAC method for identifying a sub-set of points on which to build a planar function proceeds in the following way:

i) three sample points are selected on the DSM in the patch $G_m$; the three points are chosen randomly on condition to be non-collinear; a plane passing through the three selected points is then calculated (block 305);

ii) a sub-set $J \subset G_m$ of points of the patch $G_m$ is then determined, denoted as the "consensus set", for which the heights in the DSM fall within a certain predetermined distance from the plane calculated in step i) (block 310); the number of points in the consensus set (i.e. the cardinality of the consensus set) will be herein after indicated as |J|;

iii) if the number of points |J| exceeds a predetermined threshold (decision block 315, exit branch Y), the plane is re-calculated, minimizing the distance of the heights in the DSM for all the points of J (block 320); otherwise iv) if the number of points |J| does not exceed the predetermined threshold, the above steps are repeated (decision block 315, exit branch N).

The steps from i) to iv) above typically have to be iterated a predetermined number of times, until a maximum number of iterations is reached (decision block 330); at each iteration, the consensus set J calculated at that iteration is stored (block 325); at the end of the iterations, the consensus set is selected among all those stored which includes the greatest number of points (block 335).

In this way, the "dominant", or "first-ranked", planar surface (i.e. the planar surface corresponding to the consensus set having the greatest number of points) in the patch is determined; in order to determine the "second-ranked" planar surface (i.e. the planar surface among all those stored in block 325 having the greatest consensus set after the dominant planar surface), the operations described above and schematically depicted in the flowchart of FIG. 3 are repeated on the remaining points of the patch, i.e. not considering the points belonging to the consensus set J determined in the previous run. This procedure can be repeated several times, until a predetermined criterion is satisfied, for example until a lower limit for the size of the consensus sets is reached. At the end, a certain number Q of pairs of consensus sets and associated planes $\{(J_1,\mu_1), \ldots, (J_Q,\mu_Q)\}$ is obtained for each patch: the calculated planes, associated to the consensus sets, are the hypothetic surfaces (planes, in the exemplary embodiment herein considered) forming the candidate surfaces for representing the ground surface in the considered patch. It is observed that in order for at least one of the hypothetic surfaces thus calculated to be adapted to represent the ground surface, the local DSM on the considered patch should contain points laying on the ground surface.

FIGS. 4 to 7 are 3-D views of the DSM of FIG. 1, with four hypothetic planes extracted from the DSM; in particular, figures labelled "A" are views from above, whereas figures labelled "B" are views from below.

It is pointed out that the use of the RANSAC method is not to be considered as a limitation of the present invention, and that in alternative embodiments thereof different methods might be exploited to determine the hypothetic surfaces among which the best candidate surface for representing the ground surface is then selected.

According to an embodiment of the present invention, the estimation of the distance from ground of the hypothetic surfaces (block 215 in FIG. 2) is made using a discriminant function, referred to as "implicit discriminant function". The implicit discriminant function allows discriminating between the different possible hypothetical surfaces and to choose the hypothetic surface that is more suitable to represent the surface ground.

According to an embodiment of the present invention, in order to allow discriminating among the different hypothetic surfaces and determine which of them is the surface closest to the ground surface, the relationship between the acquired surface, described in the DSM, and the generic hypothetic surface is characterized by a set of features.

The features preferably satisfy some predetermined geometrical requirements. First, a feature should be expressed by a numeric value that varies with the distance between the hypothetic surface and the ground surface. Second, different features should relate to different geometric characteristics, so to exhibit low correlation. Third, the features should be invariant to the shape and size of the patch. The Applicant has observed that satisfying this last requirement does not pose particular problems, unless the patches are very small in size.

In particular, In an embodiment of the present invention, three features are used: a first feature is the relative cardinality of the consensus set; a second feature is the resistance to a median filtering; a third feature is the height of the hypothetic surface, which, in the invention embodiment herein considered, is a planar surface.

The first feature, i.e. the relative cardinality of the consensus set associated with the generic n-th hypothetic surface in the patch $G_m$, obtained by applying the RANSAC method described above, can be expressed as:

$$f_1 = \frac{|J_n|}{G_m}$$

where $|J_n|$ denotes the cardinality (i.e., the number of points) of the consensus set $J_n$, and $|G_m|$ is the cardinality (i.e., number of points) of the considered patch $G_m$. The value of the parameter $f_1$ ranges from 0 to 1, and reaches the maximum when the whole patch $G_m$ forms the consensus set. Since in many practical cases the ground represents the widest planar surface in the DSM on a considered patch, a high value for the parameter $f_1$ means a high likelihood that the corresponding hypothetic surface corresponds to the ground. It is observed that the parameter $f_1$ satisfies the three requirements set forth above.

Concerning the second feature, i.e. the resistance to the median filtering, it is observed that the generic hypothetic surface (plane) intersects the surface described by the DSM. As previously described, the consensus set is formed of points where the DSM surface and the hypothetic plane are close to each other, and thus it depends on the relative slope of the two surfaces. Those areas of the considered patch where the DSM surface is parallel and close to the hypothetic plane are represented by "thick" structures in the consensus set (i.e. by several closely-located points forming together a continuous, "thick" structure), whereas in the areas where the two surfaces intersect but have different slopes the consensus set exhibits "thin" structures.

The structures present in the consensus set are useful to assess the degree of correspondence between the ground surface and the hypothetic plane taken as the candidate surface. Two extremes can be examined: if the structures in the consensus set are thick in a certain area of a considered patch, then probably a relatively wide planar structure is present in that area, like a building roof or a portion of exposed ground surface; if instead the structures in the consensus set are very thin in a certain area, it is probable that the hypothetic plane crosses in that area buildings or the ground, but with a slope different from that of the ground surface.

Figure 8:
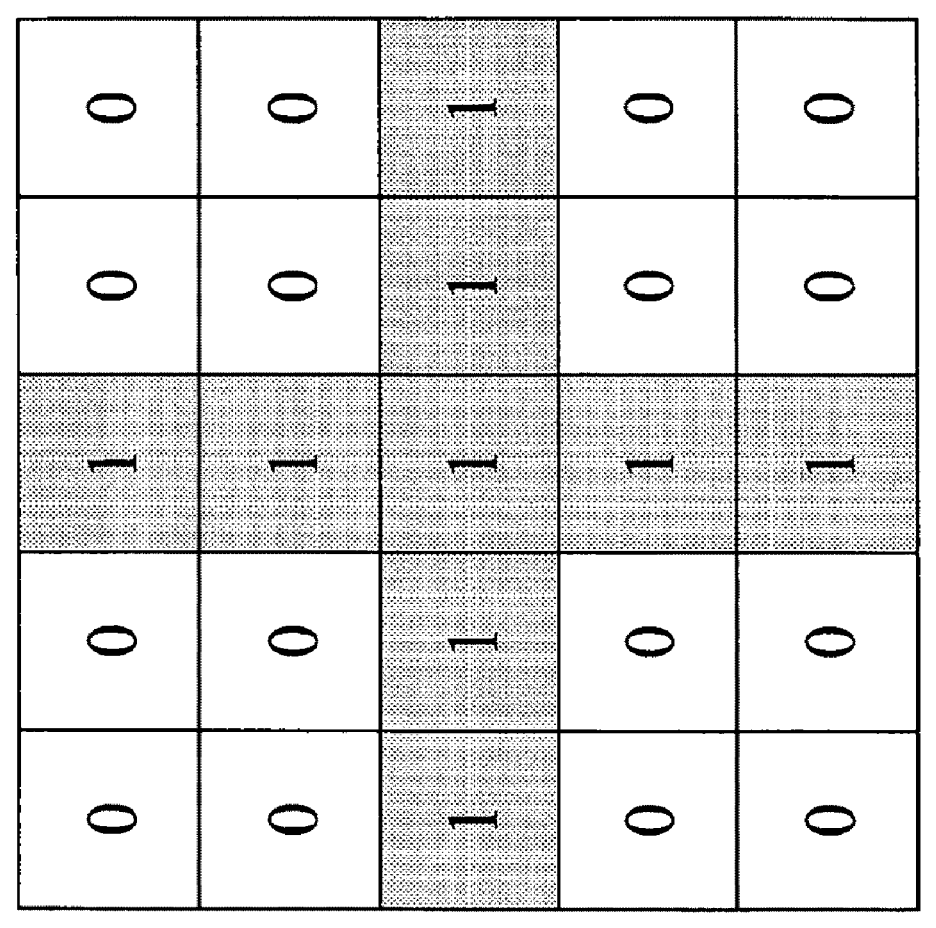

FIGS. 9A, 10A, 11A and 12A are representations of the consensus sets corresponding to the hypothetic planes depicted in FIGS. 4 to 7; the points that belong to the consensus set are indicated by a black dot, corresponding to a value "1", whereas the other points are shown in white, corresponding to a value "0". An indication of the "thickness" of the structures in the consensus set can be obtained by performing a filtering operation, preferably a median filtering, on the whole patch. Using a filtering window shaped as a cross, like for example the filtering window depicted in FIG. 8, inscribed in a 5×5 mask (with value "1" on the nine elements of the cross and value "0" on the remaining sixteen elements), all the points that belong to thin structures, for example having the shape of a line, are discarded (set to zero), whereas the points that are grouped together in relatively thick structures are essentially retained. Normally, the points that remain after the median filtering, that is the points that are kept to "1", are fewer than the points of the consensus set. Filtering by the mask of FIG. 8 works as follows: the mask is centered sequentially on each point of the patch; if the majority (i.e. at least 5 of the 9 elements of the cross in the 5×5 mask of FIG. 8) of "1" elements of the mask overlap "1" points of the patch, then the considered central point is set at "1", otherwise it is set at "0".

FIGS. 9B, 10B, 11B and 12B show the consensus sets of FIGS. 9A, 10A, 11A and 12A after the median filtering operation.

The resistance to the median filtering is defined as the ratio of the number of points in the consensus set after and before the median filtering:

$$f_2 = \frac{|M(J)|}{|J|}$$

where $M(J)$ denotes the set of points that are still valued "1" after the median filtering and $|M(J)|$ the number of such points. A value of the parameter $f_2$ close to 0 means presence of thin structures, whereas a value close to 1 means presence of thick structures. It is observed that the parameter $f_2$ satisfies the first two requirements set forth above, whereas the third requirement is satisfied if the patches are formed of connected points (i.e. the patches do not contain holes), and are sufficiently wide to avoid that the consensus set is reduced to the void set as a consequence of the median filtering.

Concerning the third feature, i.e. the height of the hypothetic surface, it is observed that trees and most man-made artefacts are objects located above the ground; therefore, among the different hypothetic surfaces (planes, in this example) considered, the one that best matches with the ground surface is likely to be one of those at lower height, in the considered patch. However, some planes may be under other planes in some area of the patch, but in the remaining areas they may be located over the other planes. According to an embodiment of the present invention, the height of a generic hypothetic plane is determined by considering the detected height (i.e., the height expressed by the DSM) in a plurality of points of the plane uniformly distributed across the patch, and then taking the maximum value; the average height calculated on the DSM of the patch is then subtracted from that maximum value, so as to avoid that the value of the feature is affected by the average height; the third feature is thus expressed by:

$$f_3 = \max\{\mu_n(1), \ldots, \mu_n(t)\} - \overline{h}$$

where $\mu_n$ denotes the generic, n-th hypothetic plane, $\mu_n(1), \ldots, \mu_n(t)$ denote the heights of t points on the considered hypothetic plane, and $\overline{h}$ is the average height of the DSM in the considered patch. The range of values that can be taken by the feature $f_3$ is of the same order of magnitude of the range of variations of the DSM on the considered patch. It is observed that this parameter satisfies the three requirements set forth above.

The three features $f_1$, $f_2$, and $f_3$ are preferably combined with one another. In particular, each of the three features, taken alone, may not be sufficient to discriminate the different hypothetical surfaces. For example, the third feature $f_3$ privileges the hypothetic plane having lower height, and this might cause errors in some practical situations, like for example when a groove in the ground (e.g., an excavation) is present: in this case, the error may consist in assigning the height of the groove to all the surrounding ground surface, which is instead at a greater height. As for the first feature $f_1$, there may be cases in which the dominant planar surface in the considered patch corresponds to the top of man-made artefacts like the roof of a large building, or an area with several contiguous buildings of approximately the same height: thus, the number of points included in the consensus set, taken alone, may not be sufficient to identify the correct hypothetic plane.

It is however pointed out that the type and number of features adopted are not limitative to the present invention: different numbers of features, of different type, may be used in alternative embodiments of the invention.

As mentioned above, considering the generic patch, the local DTM is generated by analysing the relationship between the local DSM and the set of hypothetic surfaces using an implicit discriminant function. The implicit discriminant function is a function that combines the (three in the described example) features described above.

In the following, a mathematical explanation of the way in which the implicit discriminant function is built is provided, according to embodiment of the present invention.

As previously explained, deriving a DTM from a DSM means estimating the height of the ground surface. The height to be estimated is regarded as a stochastic quantity, associated to a statistical model.

Let the ground surface's height on a generic patch $G_m$ (defining a reference area) be considered; the heights of the points in the considered patch can be arranged according to a predetermined rule, so as to obtain a column vector: the column vector thus obtained is regarded as a stochastic variable z, characterized by a Gaussian probability distribution p, given by:

$$p(z \mid \mu, \Sigma) = C \cdot \exp\left(-\frac{1}{2}(z-\mu)^T \Sigma^{-1}(z-\mu)\right) \quad (2)$$

where C is a normalization factor, the parameter $\mu$ is the expected ground surface, and the parameter $\Sigma$ is the covariance matrix. In the statistical model considered in the present invention, the expected ground surface $\mu$ in the considered patch $G_m$ is a plane (or another surface that can be described by a function that is characterized by few parameters, for example a second-degree polynomial in two variables):

$$\mu: G_m \to R$$

whose elements are arranged according to the same rule adopted for creating the column vector z. The generic element $\Sigma_{ij}$ of the covariance matrix $\Sigma$ is:

$$\Sigma_{i,j} = E((z_i - \mu_i)(z_j - \mu_j))$$

where $z_i$, $z_j$ denote the heights of the stochastic ground surface and $\mu_i$, $\mu_j$ the expected value of the ground surface heights over the points i and j of the patch $G_m$.

Let a set of N hypothetic surfaces $\mu_1, \ldots, \mu_N$ with respect to the patch $G_m$ be considered, and let each one represent a hypothesis for the expected ground surface. Also, let it be assumed that the covariance matrix is equal for all the N hypothetic surfaces. For each hypothetic surface $\mu_n$, the associated probability distribution of the heights of the points over the considered patch $G_m$ is:

$$p(z \mid \mu_n) = C \cdot \exp\left(-\frac{1}{2}(z-\mu_n)^T \Sigma^{-1}(z-\mu_n)\right).$$

Thus, the set of hypothetic surfaces leads to a set of hypothetic probability distributions. Among these, the distribution that best represents the observed data shall be chosen, and its associated hypothetic surface is selected as a model of the ground.

For choosing the best hypothetic surface, the observed height z of the points of the patch $G_m$ is considered invariable, and the expected heights $\mu_1, \ldots, \mu_N$ of the hypothetical surfaces are treated as variables. A likelihood function f is thus obtained:

$$f(\mu_n \mid z) = C \cdot \exp\left(-\frac{1}{2}(z-\mu_n)^T \Sigma^{-1}(z-\mu_n)\right),$$

expressing the likelihood that the considered hypothetic surface $\mu_n$ (i.e. the hypothetic probability distribution associated therewith) best represents the ground surface. The maximum of the likelihood function coincides with the maximum of the function, denoted "log-likelihood", being the logarithm of the likelihood function:

$$\ln f(\mu_n \mid z) = \ln C - \frac{1}{2}(z-\mu_n)^T \Sigma^{-1}(z-\mu_n) \quad (3)$$

The hypothetic surface $\mu_n$ that best represents the ground surface is that which maximizes the function (3) above, or, equivalently, the hypothetic surface for which the term:

$$g(\mu_n \mid z) = (z-\mu_n)^T \Sigma^{-1}(z-\mu_n) \quad (4)$$

that in (3) appears with the minus sign is minimized, because the term ln C in (3) does not depend on $\mu_n$, but only on the covariance matrix, which is the same for all the hypothetic surfaces.

The covariance matrix is invertible by the existence of the distribution in (2), and it is symmetric by its own definition. These two characteristics assure that the function in (4) is a norm:

$$g(\mu_n \mid z) = \|z - \mu_n\|_{\Sigma^{-1}}^2.$$

For example, if the heights of the points of the considered patch are uncorrelated and have the same variance, then the inverse matrix $\Sigma^{-1}$ is diagonal and constant, and the function in (4) is proportional to the square of the Euclidean distance between the ground surface and the hypothetic surface considered.

The function in (4), known in the art as "Mahalanobis distance", is hereinafter also referred to as the "explicit discriminant function", because, assuming that both the local DSM and the local DTM (i.e., the height of the ground surface) are known, it allows identifying, among the different hypothetic surfaces calculated for that patch, the one that best approximates the ground surface in the patch; such best approximating hypothetic surface is that characterized by the lowest value of the explicit discriminant function (4):

$$g(\mu_i \mid z) < g(\mu_j \mid z), \forall j \neq i$$

However, in the derivation of a DTM from a DSM the height of the ground surface is by definition unknown, being the parameter to be determined (indeed, as already mentioned, the DSM does not represent the height of the ground surface everywhere in the considered area or patch, but only where the ground surface is not covered by other objects). Thus, the explicit discriminant function cannot be used to identify the hypothetic surface that best represent the ground surface. According to an embodiment of the present invention, the implicit discriminant function is an approximation that provides an estimate of the explicit discriminant function; such an approximation function is derived through a supervised learning process, using a training dataset, which includes both the DSM and the DTM of a predetermined geographic area (i.e., an area in respect of which not only the DSM, but also the height of the ground surface is known, assumed to have been determined in advance).

According to an embodiment of the present invention, the implicit discriminant function is a parametric function; the available quantities in the process of deriving a DTM from a DSM are the heights included in the DSM, and the features calculated as discussed above. Let the implicit discriminant function be denoted $\hat{g}_\theta$, with:

$$\hat{g}_\theta(\mu_n, w) = F(f(\mu_n, w), \theta);$$

wherein $\mu_n$ is the n-th generic hypothetic surface, w the height derived from the DSM, $f(\mu_n, w)$ the vector containing the features in respect of the generic hypothetic surface $\mu_n$ and the height w, $\theta$ a vector of parameters, and; F a function. The learning process is intended to determine the values to be assigned to the parameters $\theta$.

The problem of determining the implicit discriminant function is twofold; first, the functional form must be chosen, thereafter its parameters must be computed.

As far as the functional form is concerned, the following observation is useful. The function F must be capable of estimating the explicit discriminant function value, for the data used during the learning phase as well as for the data used after the learning phase has been concluded. On one hand therefore, this requirement has to do with the capability of approximation, that is the flexibility that allows the implicit discriminant function to well approximate the samples of the explicit discriminant function used during the learning phase. On the other hand, the function should be capable of prediction, in the sense that it should be able to give good estimates of the explicit discriminant function on data not used in the learning phase. An excessive approximation capability can cause the function to adhere too much to the learning dataset, and to badly represent the data used in the calculation of the DTM.

According to an embodiment of the present invention, the prediction capability of the function is privileged; to this purpose, the form of an affine function is chosen for the function F:

$$F(f(\mu_m, w), \theta) = [f_1(\mu_m, w) \quad \ldots \quad f_L(\mu_m, w) \quad 1] \begin{bmatrix} \theta_1 \\ \vdots \\ \theta_{L+1} \end{bmatrix} \quad (6)$$

which includes $L+1$ parameters $\theta_i$ and $L$ features $f_i$. This form of function has a sufficiently high generality, i.e. it ensures a good prediction capability, while using relatively few parameters. It is pointed out that the chosen form of the function F ensures the possibility of optimizing the parameters, by projection onto a linear sub-space, as explained in the following.

In the exemplary embodiment considered herein, the features are three, so the implicit discriminant function takes the form:

$$F(f, \theta) = \left( \sum_{r=1}^{3} f_r \theta_r \right) + \theta_4.$$

The learning process consists in determining the parameters $\theta$ of the implicit discriminant function. The training data used in the learning process are related to a DSM and a DTM corresponding to a predetermined geographic area, characterized by a support S and by a subdivision into patches. Let $\{S_n\}_{n=1}^{N}$ denote the subdivision of the support S (which can coincide with support G or be different from support G) into N patches; let $\{w_1, \ldots, w_N\}$ denote the N local DSMs, each one associated to a respective patch; let also $\{z_1, \ldots, z_N\}$ denote the (already known) N local DTMs, each one associated to a respective patch, and providing the ground surface height in each point of the associated patch. For the generic n-th patch, let $\{\mu_1^n, \ldots, \mu_{M_n}^n\}$ denote a respective set of $M_n$ hypothetic surfaces, determined for example through the RANSAC method described in the foregoing.

The learning process approximates the explicit discriminant function through a transformation of the features obtained applying the function F:

$$F(f(\mu_m, w), \theta) = \hat{g}_\theta(\mu_m, w) \approx g(\mu_m | z)$$

where $g(\mu_m|z)$ denotes the explicit discriminant function, $\hat{g}_\theta$ denotes the implicit discriminant function, $\mu_m$ is the generic hypothetic surface, z is the height available from the local DTM, and w denotes the height available from the local DSM.

In an embodiment of the present invention, the aim of the learning process is to minimize the expected quadratic error:

$$\hat{\theta} = \underset{\theta}{\operatorname{argmin}} E((g(\mu | z) - \hat{g}_\theta(\mu, w))^2) \quad (7)$$

where E denotes the expected value, i.e. the average calculated over all the training dataset.

The problem expressed by (7) can be reformulated as:

$$\hat{\theta} = \underset{\theta}{\operatorname{argmin}} \frac{1}{\sum_{n=1}^{N} M_n} \sum_{n=1}^{N} \sum_{m=1}^{M_n} (g(\mu_m^n | z_n) - F(x(\mu_m^n, w_n), \theta))^2. \quad (8)$$

It is pointed out that the optimal parameter $\hat{\theta}$ is independent from the constant factor $$1 \Big/ \sum_n M_n,$$

thus it can be deleted from (8). Considering the affine function of (6), the parameters can be determined solving a system of linear equations, and the equation (8) can be rewritten as:

$$\hat{\theta} = \underset{\theta}{\operatorname{argmin}} \|X\theta - \Gamma\|^2, \quad (9)$$

where X denotes the matrix of the features of all the hypothetic surfaces identified in all the patches of the support S:

$$X = \begin{bmatrix} f_1(\mu_1^1, w_1) & \ldots & f_L(\mu_1^1, w_1) & 1 \\ \vdots & \ddots & \vdots & \vdots \\ f_1(\mu_{M_1}^1, w_1) & \ldots & f_L(\mu_{M_1}^1, w_1) & 1 \\ \vdots & \ddots & \vdots & \vdots \\ f_1(\mu_1^N, w_N) & \ldots & f_L(\mu_1^N, w_N) & 1 \\ \vdots & \ddots & \vdots & \vdots \\ f_1(\mu_{M_N}^N, w_N) & \ldots & f_L(\mu_{M_N}^N, w_N) & 1 \end{bmatrix},$$

$\theta$ denotes the vector of the parameters:

$$\theta = \begin{bmatrix} \theta_1 \\ \vdots \\ \theta_{L+1} \end{bmatrix}$$

and $\Gamma$ denotes the vector of the values of the explicit discriminant function:

$$\Gamma = \begin{bmatrix} g(\mu_1^1, z_1) \\ \vdots \\ g(\mu_{M_1}^1, z_1) \\ \vdots \\ g(\mu_1^N, z_N) \\ \vdots \\ g(\mu_{M_N}^N, z_N) \end{bmatrix}.$$

A solution to equation (9) is given by:

$$\hat{\theta} = (X^T X)^{-1} X^T \Gamma.$$

Figure 13:
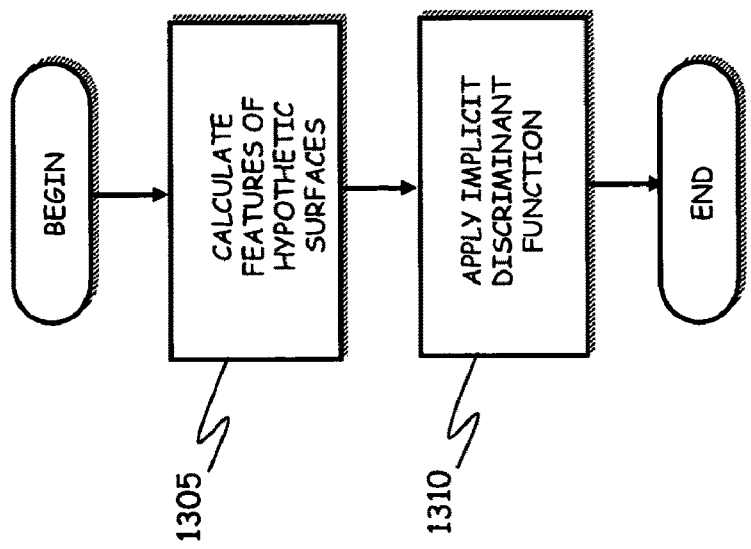
FIG. 13 shows, in terms of a schematic flowchart, the main actions for selecting, among the hypothetic surfaces calculating in respect of a generic patch, a best candidate for representing the ground surface, in an embodiment of the present invention.

Once the implicit discriminant function has been built, it can be used in the process of deriving an unknown DTM from a DSM to identify, among the different hypothetic surfaces calculated in the generic patch, the one that best approximates the ground surface (block 210 in the flowchart of FIG. 2). Thus, as schematically depicted in FIG. 13, the processing of the local DSMs to identify the candidate surface in the generic patch that best approximates the ground surface includes calculating, for each of the determined hypothetic surfaces (planes, in this example) the respective (three) features (block 1305), and then applying the implicit discriminant function (block 1310).

Concerning the size of the patches, it is observed that in order to be likely that, in the generic patch, portions of ground surface are visible, the patch size should not be too small (otherwise, it may happen in the practice that the whole area corresponding to the patch is covered by man-made artefacts, like for example a relatively large building). However, the size of the patches should not be too large, in order for the assumption of local planarity of the ground surface to be valid. The Applicant has experimentally observed that large patches succeed in effectively eliminating the objects covering the ground surface, in the sense that the detected surface does coincide with the ground, but small depressions of the ground surface, like roads in trenches and rivers, are hardly detected. In contrast, small patches allow detecting small depressions, but tend to confuse the top of the objects with the ground surface, when these objects occupy the whole area of the patch.

The Applicant has found that the problem of choosing the patch dimensions can be solved by using patches of different size, so as to keep the advantages of both small-size patches and relatively large patches.

Figure 14:
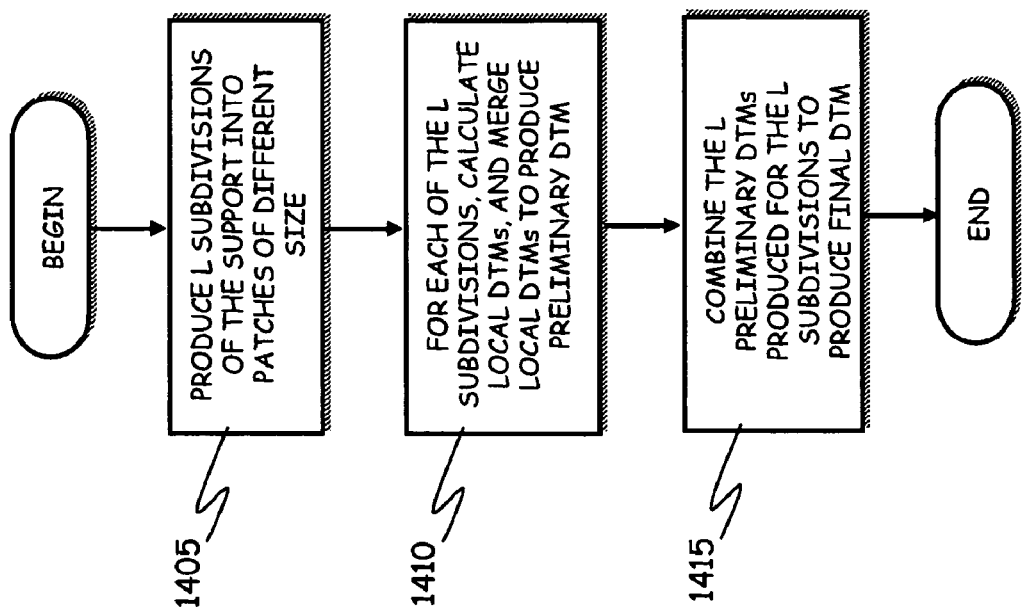
FIG. 14 shows, in terms of a schematic flowchart, the main actions of a process for calculating a final DTM starting from a DSM exploiting patches of different sizes, in an embodiment of the present invention.

Referring to the schematic flowchart of FIG. 14, in a preferred embodiment of the present invention, given the support G, a plurality of L different subdivisions of the support into patches is considered (block 1405):

$$\{G_1^1, \ldots, G_{K_1}^1\}, \{G_1^2, \ldots, G_{K_2}^2\}, \ldots, \{G_1^L, \ldots, G_{K_L}^L\},$$

where the patches in the generic one of the L different subdivisions of the support G cover the entire support:

$$\bigcup_{k=1}^{K_j} G_k^j = G; j = 1, \ldots, L.$$

Advantageously, the size of the patches in the different subdivisions of the support G are different, in order to leverage the advantages provided by patches of small size, and those provided by patches of relatively large size. In particular, in an exemplary embodiment of the present invention, three different subdivisions (L=3) of the support G into patches are considered, each subdivision including patches of constant size and partially overlapping. For example, the patches may be square in shape, of side equal to 500 m, 250 m and 125 m, and arranged on a grid with a superposition between adjacent patches equal to approximately half the side of the patch.

For the generic subdivision $\{G_1^j, \ldots, G_{K_j}^j\}$, a respective preliminary DTM is calculated, starting from the DSM (block 1410). In particular, for each patch in the considered subdivision $\{G_1^j, \ldots, G_{K_j}^j\}$, the local DTM is calculated; then, the local DTMs calculated for the different patches of the considered subdivision $\{G_1^j, \ldots, G_{K_j}^j\}$ are merged together, thereby obtaining a preliminary DTM; the preliminary DTM thus obtained is partially continuous. The discontinuities in the preliminary DTM are then eliminated, to obtain a smooth preliminary DTM.

The above operations are performed, in succession or preferably in parallel, for all the L different subdivisions into patches of the support. Once the smooth preliminary DTMs in respect of all the L different subdivisions have been calculated, they are combined together to obtain a final DTM (block 1415).

These operations are described in greater detail hereinafter.

Considering the generic subdivision into patches $\{G_1^j, \ldots, G_{K_j}^j\}$ of the support G, in order to calculate the local DTM for the generic patch of the subdivision, the hypothetic surfaces in that patch are calculated from the local DSM in the way discussed above, for example using the RANSAC method; the consensus sets associated with each hypothetic surface are similarly calculated.

Then, the features for each hypothetic surface are calculated from the local DSM, in the way described in the foregoing.

The implicit discriminant function is then used to identify which, among the different hypothetic surfaces in the considered patch, best approximates the ground surface; this best approximating surface is in particular the hypothetical surface having the lowest value of the implicit discriminant function. In this way, for each patch of the considered subdivision of the support, one hypothetic surface (i.e., one plane, in the example herein considered) is obtained, which represents the best approximation of the ground surface in that patch. The local DTM in the considered patch is represented by the hypothetic surface chosen as the best candidate for that patch.

The local DTMs thus obtained refer to partially overlapping patches, due to the criterion of subdivision of the support into patches. The partially continuous preliminary DTM is created by considering the contributions from all the local DTMs calculated for all the patches of the considered subdivision of the support. A generic point p in the support might be included into a plurality of T different patches of the considered subdivision of the support:

$$p \in G_{m_1}, G_{m_2}, \ldots, G_{m_T}$$

and thus be interested by a plurality (for example four) of T different local DTMs, where the number T depends on the considered point p. The value of the partially continuous preliminary DTM on such a point p is calculated as a convex combination of the individual contributions:

$$\mu(p) = \sum_{t=1}^{T} c_t \mu_{m_t}(p); c_t \in [0, 1], \sum_{t=1}^{T} c_t = 1$$

wherein $\mu_{m_t}(p)$ denotes the height associated to the point p in the local DTM calculated for the patch $G_{m_t}$, $\mu(p)$ denotes the height associated to the point p in the partially continuous preliminary DTM, and $c_t$ are weights assigned to the local DTMs in the calculation of the height associated to the point p; for example, choosing the weights $c_t = T^{-1}$, the average of the local DTMs is obtained.

The partially continuous preliminary DTM is typically affected by discontinuities along the edges of the patches in the subdivision of the support. In order to eliminate the discontinuities, the partially continuous preliminary DTM may be approximated by a surface described by a smooth function, built for example by under-sampling the partially discontinuous preliminary DTM; in this way, the samples may be used as interpolation nodes. In order to avoid losing details, the under-sampling should be sufficiently dense. In a preferred embodiment of the invention, the patches overlap in such a way that the partially continuous preliminary DTM is continuous over a quarter of each patch; in these quarters of patch the under-sampling allows selecting at least three points, so as to maintain a representation of the plane. However, it is preferable to use four points as this allows a regular sampling grid, while at the same time maintaining a representation of the plane. The smooth function is built by bilinear interpolation.

The smooth preliminary DTMs obtained for each subdivision into patches of the support are then combined. As observed in the foregoing while discussing the size of the patches, the preliminary DTMs obtained for patches of large size allows identifying the ground surface even in dense urban areas, whereas those calculated in respect of small patches allows detecting small depressions in the ground.

In both cases, the actual height of the ground surface is smaller than or equal to the detected one; thus, the final DTM is calculated by taking, in each point of the support, the minimum of the heights in the different preliminary DTMs. The final DTM H is thus:

$$H=\{\min\{h_1(x,y), \ldots, h_L(x,y)\}:(x,y) \in G\}$$

where $h_i(x,y)$ denotes the height at the point of coordinates (x,y) in the i-th preliminary DTM.

Figure 16:
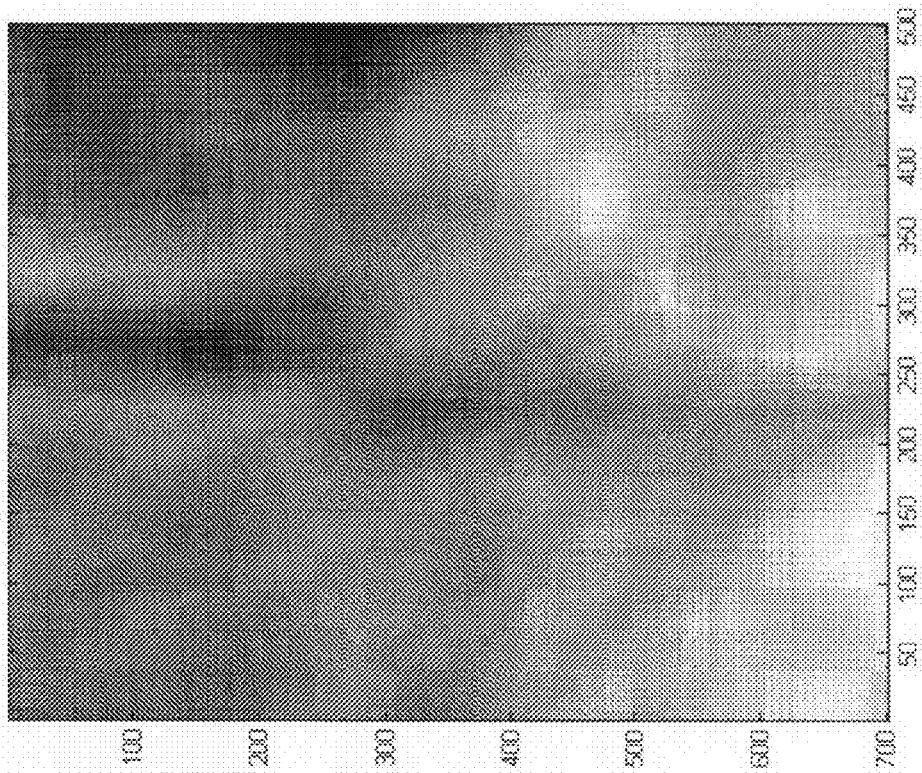
FIGS. 15, 16 and 17 show three DTMs calculated for the DSM of FIG. 1, using three different subdivisions in patches of the support.
Figure 15:
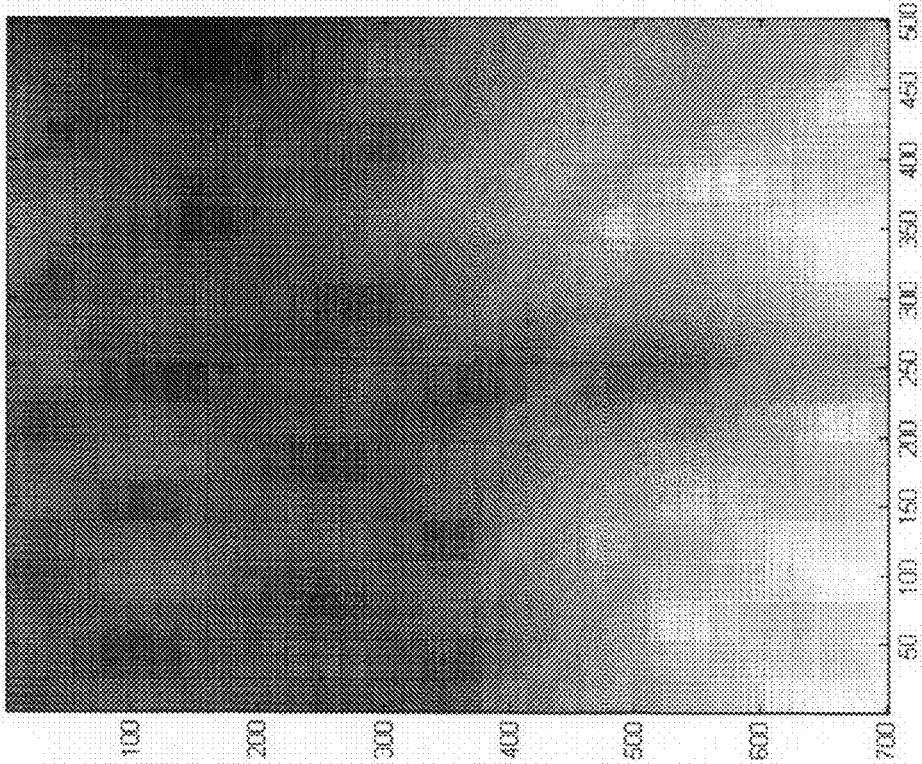
Figure 18:
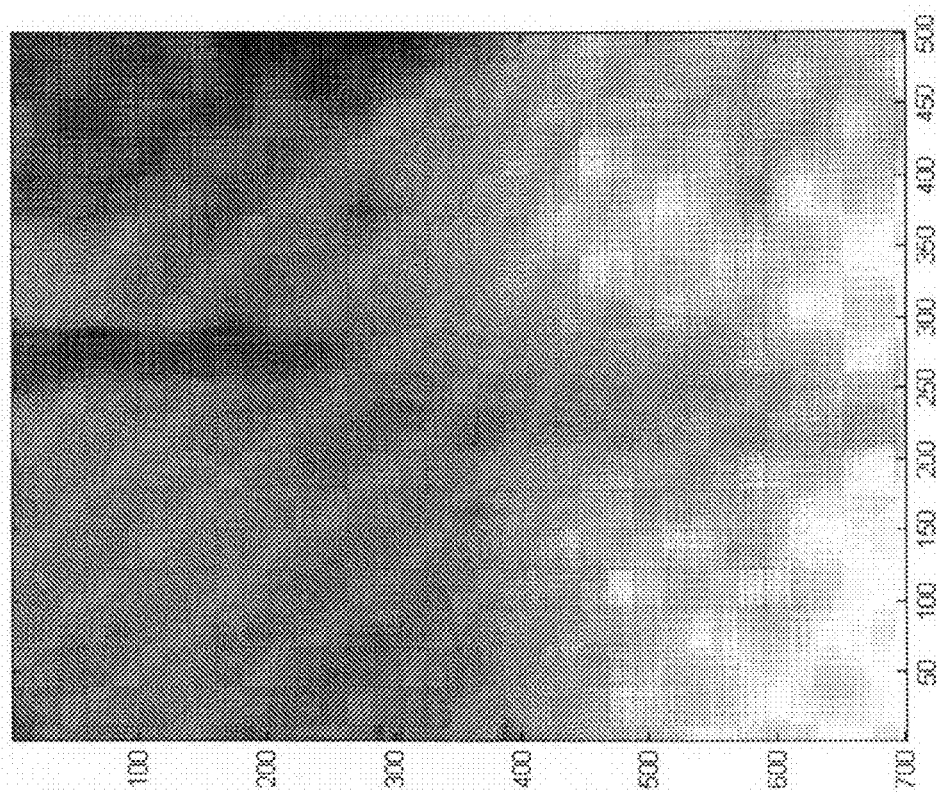
FIG. 18 shows a DTM obtained by combining the three DTMs of FIGS. 15, 16 and 17, according to an embodiment of the present invention.
Figure 17:
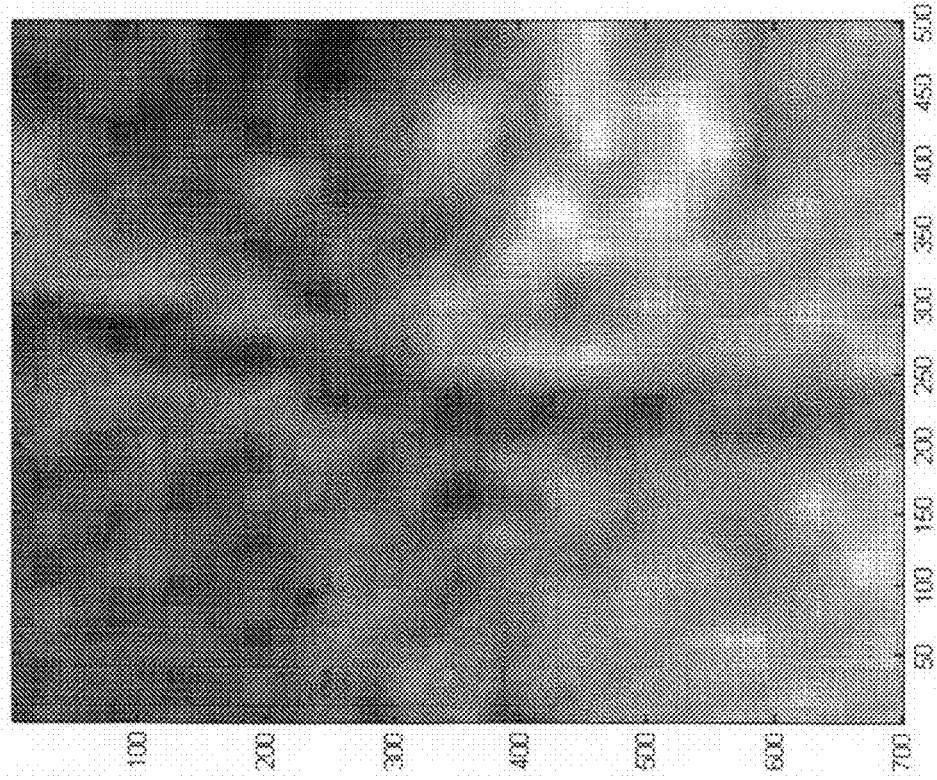
Figure 19:
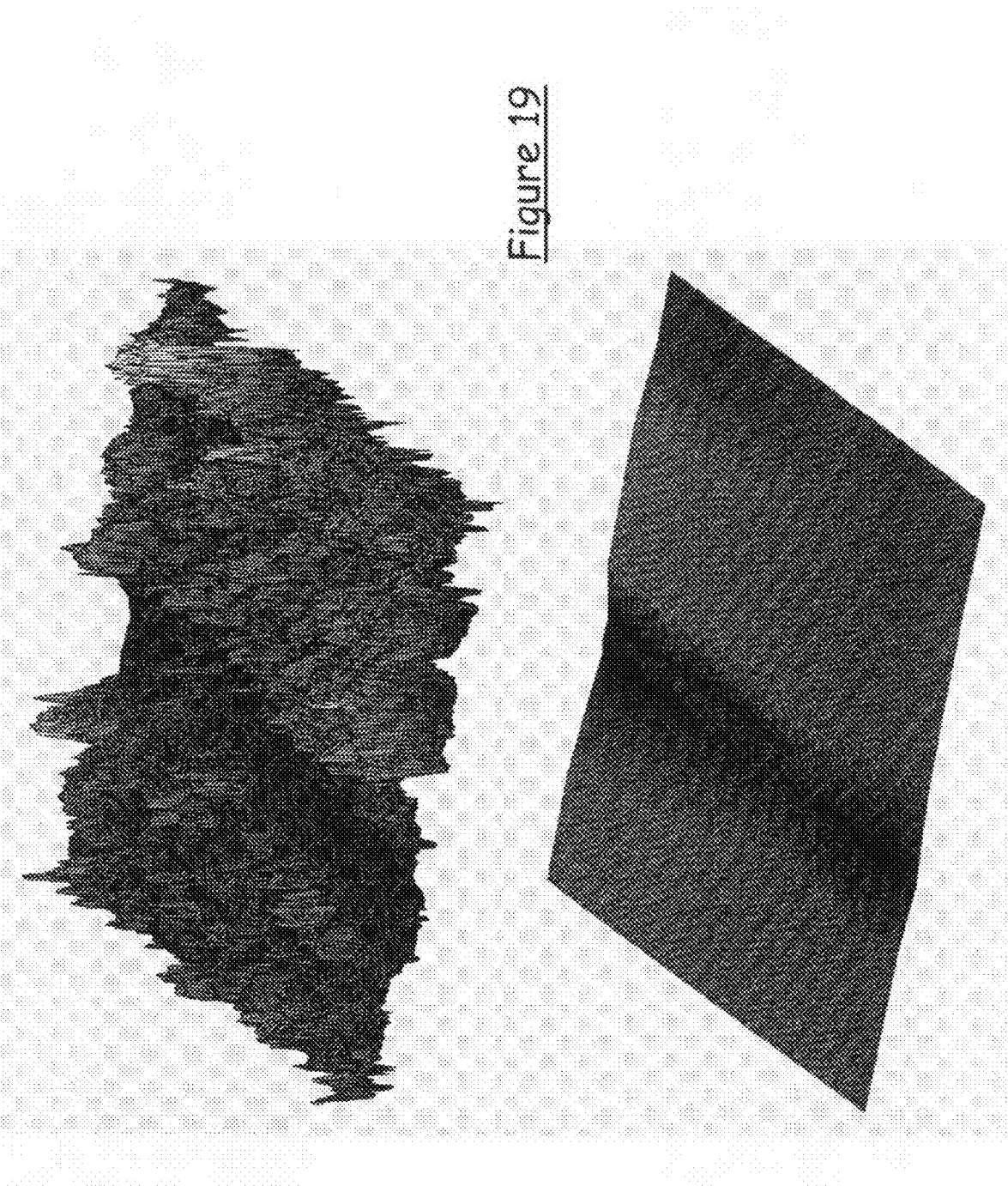
FIG. 19 shows three-dimensional views of a portion of the DSM of FIG. 1 and of the corresponding DTM, calculated according to an embodiment of the present invention.

FIGS. 15, 16 and 17 shows three preliminary DTMs produced for the DSM of FIG. 1, using patches of three different sizes, particularly square patches of 500 m, 250 m and 125 m of side, respectively. FIG. 18 shows the final DTM obtained combining the three preliminary DTMs. FIG. 19 shows a portion of the initial DSM, and the corresponding portion of final DTM.

Figure 20:
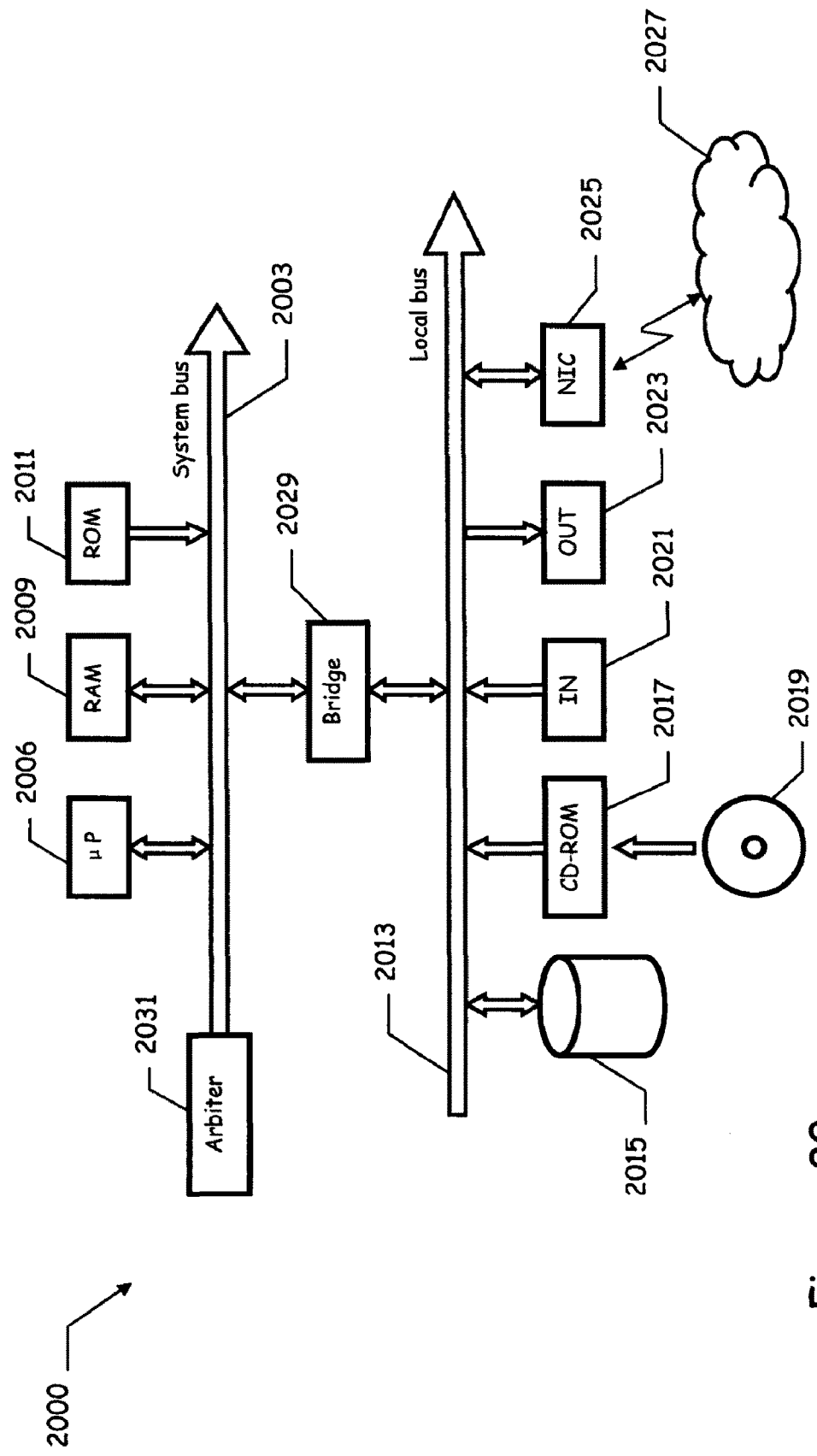
FIG. 20 schematically depicts, in terms of functional blocks, the essential components of a data processing apparatus adapted to implement the method according to the present invention.

The above described method may in particular be carried out by a suitably programmed data processing apparatus or system like a personal computer or a workstation; the structure of a general-purpose computer 2000 is schematically depicted in FIG. 20.

The computer 2000 is comprised of several units that are connected in parallel to a system bus 2003. In detail, one (possibly more) processor 2006 controls the operation of the computer 2000; a RAM 2009 is directly used as a working memory by the microprocessor 2006, and a ROM 2011 stores the basic code for a bootstrap of the computer 2000. Peripheral units are connected (by means of respective interfaces) to a local bus 2013. Particularly, mass storage devices comprise a hard disk 2015 and a CD-ROM/DVD-ROM drive 2017 for reading CD-ROMs/DVD-ROMs 2019. Moreover, the computer 2000 typically includes input devices 2021, for example a keyboard and a mouse, and output devices 2023, such as a display device (monitor) and a printer. A Network Interface Card (NIC) 2025 is used to connect the computer 2000 to a network 2027, e.g. a LAN. A bridge unit 2029 interfaces the system bus 2003 with the local bus 2013. Each microprocessor 2006 and the bridge unit 2029 can operate as master agents requesting an access to the system bus 2003 for transmitting information; an arbiter 2031 manages the granting of the access to the system bus 2003.

Figure 21:
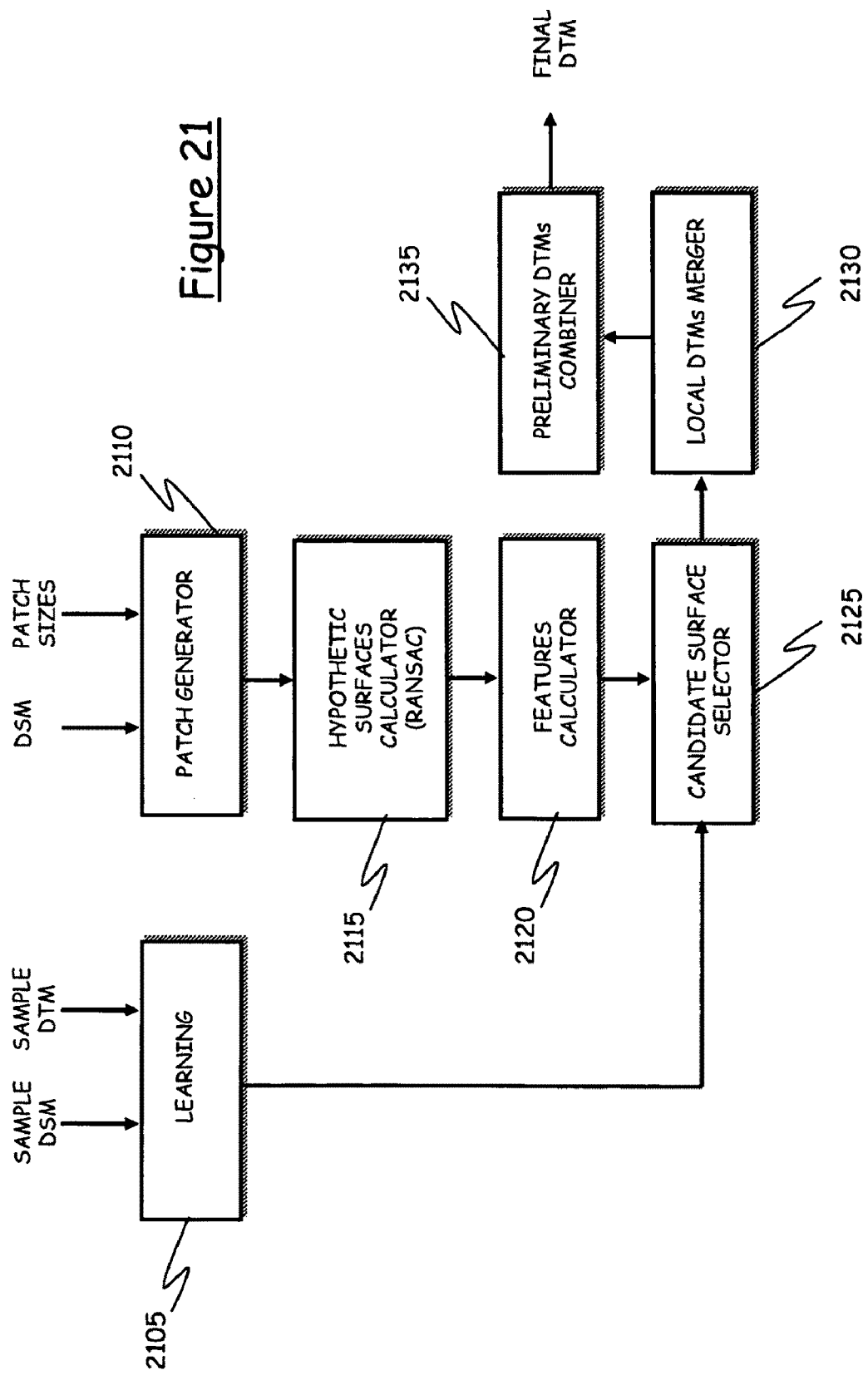
FIG. 21 schematically shows, in terms of functional blocks, modules of a software that, when executed by the data processing apparatus of FIG. 20, is adapted to implement the method according to an embodiment of the present invention.

In FIG. 21, a system adapted to implement the above-described method is schematically shown, according to an embodiment of the invention. In particular, FIG. 21 schematically depicts a partial content of the working memory 2009 of the computer of FIG. 20. The information (programs and data) is typically stored on the hard disks and loaded (at least partially) into the working memory when the program is executed. The programs may be initially installed onto the hard disks from, e.g., CD-ROMs or DVD-ROMs, or they may be downloaded from, e.g., a distribution server machine through the data communications network 2027.

A learning module 2105 is adapted to carry out the learning process described above, using sample DSM and DTM, so as to calculate the parameters for the implicit discriminant function.

A patch generator module 2110 is adapted to receive a DSM to be converted into a DTM, and, based on information concerning the possible different sizes of the patches, to generate a plurality of (e.g., three) subdivisions into patches of the support of the DSM.

A hypothetic surface calculator module 2215 is adapted to calculate, for each patch in each subdivision of the support, a number of hypothetic surfaces, among which the candidate surface for representing the ground surface will be chosen. For example, the module 2215 uses the RANSAC method.

A features calculator module 2120 is adapted to calculate the features in respect of the hypothetic surfaces.

A candidate surface selector module 2125 is adapted to choose, based on the features and using the implicit discriminant function provided by module 2105, the best candidate hypothetic surface for representing the ground surface. The module 2125 produces, for each subdivision of the support, a plurality of local DTMs, one for each patch.

A local DTM merger module 2130 is adapted to merge the local DTMs, and to smoothen the discontinuities, so as to obtain, for each subdivision of the support, a preliminary DTM.

A preliminary DTMs combiner module 2135 is adapted to combine the preliminary DTMs generated by the module 2130 to produce the final DTM.

It is observed that at least some of the modules described above may take the form of different, independent software programs.

Thanks to the present invention, it is possible to derive a DTM from a DSM automatically, without the need of additional data like for example cadastral maps, and even in cases when the starting DSM is affected by relatively high noise, i.e. even using relatively low-quality DSMs, obtained through low-cost and fast techniques like photogrammetry.

The Applicant has experimentally found that the invention allows deriving good DTMs even when the ground surface, in the DSM, is represented only to a marginal extent.

The present invention is particularly useful in applications like the planning of the coverage by radiocommunications networks, e.g. mobile telephony networks like GSM and UMTS networks.

The present invention has been described here making reference to an embodiment thereof. Those skilled in the art will recognize that several modifications to the described embodiment, as well as alternative embodiments of the invention are possible, without departing from the scope of protection defined in the appended claims.

For example, the function used to approximate the explicit discriminant function may not be an affine function.

Also, the local DTMs may not be planar surfaces.

The coefficients $c_t$ to be used in the merging of the preliminary DTMs may be determined using an automatic learning process.

The type and the number of features, that in the considered embodiment was equal to three, may be different; for example, one, two or more than three features may be used.

The invention claimed is:

1. A method of deriving a digital terrain model from a digital surface model of an area of interest, comprising:
   a) dividing the area of interest into a plurality of area portions;
   b) for each area portion calculating, from the digital surface model, a set of candidate surfaces adapted to represent a ground surface in said area of interest;
   c) for those area portions having at least two candidate surfaces, estimating a distance of each candidate surface from a digital surface model of the ground surface for that area portion by using a function of a set of geometrical features related to a considered candidate surface, said function being derived from a known relation between each candidate surface and the digital surface model of the ground surface, and selecting, as representative of the ground surface in each said area portion having at least two candidate surfaces, a surface among said candidate surfaces having the smallest estimated distance from said ground surface to act as a local surface model for that area portion;

d) for those area portions having only one candidate surface, using that one candidate surface to act as a local surface model for that area portion; and e) merging said local digital terrain models for each portion to obtain the digital terrain model of the area of interest.

2. The method of claim 1, wherein the area portions of said plurality of area portions are such that each area portion intersects with at least another area portion of said plurality of area portions.

3. The method of claim 2, comprising selecting, for each point of the area of interest belonging to at least two area portions, a minimum height among heights of the local digital terrain models derived for said area portions at that point of the area of interest.

4. The method of claim 1, wherein step b) comprises applying a random sample consensus method.

5. The method of claim 1, wherein step b) comprises:

b1) selecting three sample points on the digital surface model;

b2) calculating a plane passing through the three selected sample points;

b3) determining, in said area of interest, a sub-set of points in the digital surface model, the sub-set of points being a distance from a plane within a predetermined range;

b4) determining cardinality of said sub-set of points; and b5) if said cardinality exceeds a predetermined threshold, re-calculating the plane by minimizing said distance for all points of the sub-set;

b6) otherwise, if said cardinality is lower than the predetermined threshold, repeating steps b1) to b4).

6. The method of claim 5, comprising repeating steps b1) to b6) a predetermined number of times.

7. The method of claim 6, comprising storing said sub-set of points at each repetition of steps b1) to b6).

8. The method of claim 7, comprising selecting, among the stored sub-set of points, the sub-set of points having the greatest cardinality, wherein the plane associated with the selected sub-set of points defines one of said candidate surfaces.

9. The method of claim 8, comprising repeating steps from b1) to b6) omitting said selected sub-set of points so as to find at least another one of said candidate surfaces.

10. The method of claim 9, wherein the steps of storing said sub-set of points, selecting the sub-set of points having the greatest cardinality and repeating steps b1) to b6) omitting said selected sub-set of points are performed in each of said area portions.

11. The method of claim 1, wherein said set of geometrical features related to the considered candidate surface comprises one or more among:

a relative cardinality between a set of points that belong to at least a portion of said area of interest and wherein the distance from the considered candidate surface is within a predetermined range and the set of all the points is within said portion of said area of interest;

a resistance to a median filtering of said set of points that belong to at least a portion of said area of interest and wherein the distance from the considered candidate surface is within a predetermined range; and a height of the candidate surface.

12. The method of claim 1, wherein said function is:

$$F(f(\mu_m, w), \theta) = \begin{bmatrix} f_1(\mu_m, w) & \cdots & f_L(\mu_m, w) & 1 \end{bmatrix} \begin{bmatrix} \theta_1 \\ \vdots \\ \theta_{L+1} \end{bmatrix}$$

wherein $\mu_m$ denotes the generic candidate surface, w denotes a height derived from the digital surface model, $f_1 \ldots f_L$ are said geometrical features, and $\theta_1, \ldots, \theta_{L+1}$ are parameters.

13. The method of claim 12, wherein said set of geometrical features related to the considered candidate surface comprises one or more among:

a relative cardinality between a set of points that belong to at least a portion of said area of interest and wherein the distance from the considered candidate surface is within a predetermined range and the set of all the points is within said portion of said area of interest;

a resistance to a median filtering of said set of points that belong to at least a portion of said area of interest and wherein the distance from the considered candidate surface is within a predetermined range; and a height of the candidate surface, and wherein said function is:

$$F(f, \theta) = \left( \sum_{r=1}^{3} f_r \theta_r \right) + \theta_4$$

wherein $f_1$, $f_2$ and $f_3$ represent said relative cardinality, said resistance to the median filtering, and said height of the candidate surface.

14. The method of claim 1, wherein said known relation is:

$$g(\mu_m | z) = (z - \mu_m)^T \Gamma^{-1} (z - \mu_m),$$

wherein $\mu_m$ denotes a generic m-th candidate surface and z denotes a generic local digital terrain model.

15. The method of claim 12, wherein said parameters are derivable from the equation:

$$\hat{\theta} = \arg\min_{\theta} \sum_{n=1}^{N} \sum_{m=1}^{M_n} (g(\mu_m^n | z_n) - F(f(\mu_m^n, w_n), \theta))^2$$

wherein N denotes the number of said area portions, $M_n$ denotes the number of said candidate surfaces for the n-th area portion, $\mu_m^n$ denotes the m-th candidate surface for the n-th area portion, $z_n$ denotes the local digital terrain model for the n-th area portion, and $w_n$ denotes the local digital surface model for the n-th area portion.

16. The method of claim 1, wherein merging comprises combining the local digital terrain models by means of a convex combination.

17. The method of claim 16, further comprising removing discontinuities in the digital surface model obtained by combining the local digital terrain models.

18. The method of claim 1, further comprising repeating steps a) to c) for at least two subdivisions of said area of interest area portions different in size.

19. A computer program product comprising a non-transitory computer readable medium having stored therein a computer program adapted to implement, when executed, the method according to claim 1.

20. A system for deriving a digital terrain model from a digital surface model of an area of interest, comprising:
   a) means for dividing the area of interest into a plurality of area portions;
   b) means for calculating, for each area portion, a set of candidate surfaces adapted to represent a ground surface in said area of interest from the digital surface model;
   c) means for estimating, for those area portions having at least two candidate surfaces, a distance of each candidate surface from a digital surface model of the ground surface for that area portion by using a function of a set of geometrical features related to a considered candidate surface, said function being derived from a known relation between each candidate surface and the digital surface model of the ground surface and selecting, as representative of the ground surface in each said area portion having at least two candidate surfaces, a surface among said candidate surfaces having the smallest estimated distance from said ground surface to act as a local surface model for that area portion;
   d) means for using, for those area portions having only one candidate surface, that one candidate surface to act as a local surface model for that area portion; and
   e) means for merging said local digital terrain models for each portion to obtain the digital terrain model of the area of interest.

* * * * *